US008990849B2

(12) United States Patent
Brueck et al.

(10) Patent No.: US 8,990,849 B2
(45) Date of Patent: Mar. 24, 2015

(54) ADVERTISEMENT INSERTION INTO MEDIA CONTENT FOR STREAMING

(71) Applicant: Verizon Patent and Licensing Inc., Basking Ridge, NJ (US)

(72) Inventors: David F. Brueck, Saratoga Springs, UT (US); C. Ryan Owen, Riverton, UT (US); Tyler Bye, Lehi, UT (US); Nathan James Edwards, Orem, UT (US); Ken Brueck, Lehi, UT (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/764,488

(22) Filed: Feb. 11, 2013

(65) Prior Publication Data
US 2014/0259048 A1    Sep. 11, 2014

Related U.S. Application Data

(60) Provisional application No. 61/598,519, filed on Feb. 14, 2012.

(51) Int. Cl.
*H04N 7/10* (2006.01)
*H04N 7/025* (2006.01)
*H04N 21/235* (2011.01)
*H04N 21/234* (2011.01)
(Continued)

(52) U.S. Cl.
CPC ....... *H04N 21/235* (2013.01); *H04N 21/23424* (2013.01); *H04N 21/4305* (2013.01); *H04N 21/6125* (2013.01); *H04N 21/8133* (2013.01); *H04L 65/601* (2013.01)

USPC .............. 725/32; 725/34; 725/35; 725/36

(58) Field of Classification Search
USPC .................................. 725/32, 34, 35, 36
See application file for complete search history.

(56) References Cited

U.S. PATENT DOCUMENTS

| 4,535,355 A | 8/1985 | Arn et al. |
| 5,953,506 A | 9/1999 | Karla et al. |

(Continued)

FOREIGN PATENT DOCUMENTS

| CA | 2466482 | 5/2003 |
| EP | 0711077 A2 | 5/1996 |

(Continued)

OTHER PUBLICATIONS

Wicker, Stephen B., "Error Control Systems for Digital Communication and Storage", Prentice-Hall, Inc., New Jersey, USA, 1995 (Book: see NPL's Parts 1-6).

(Continued)

*Primary Examiner* — John Schnurr

(57) ABSTRACT

Methods and systems for advertisement insertion into streaming media content are described. In one method, an advertisement insertion tool receives a first indication of a start time of an advertisement break to be inserted into a stream of slices of media content. The advertisement insertion tool identifies a first slice of the slices that encompasses the start time of the advertisement break. The first slice comprises video frames. The advertisement insertion tool truncates the first slice to contain the video frames up to the start time of the advertisement break. An advertisement can be inserted after the truncated first slice and before a next second slice in the stream.

20 Claims, 10 Drawing Sheets

(51) Int. Cl.
*H04N 21/43* (2011.01)
*H04N 21/61* (2011.01)
*H04N 21/81* (2011.01)
*H04L 29/06* (2006.01)

(56) References Cited

U.S. PATENT DOCUMENTS

| | | | |
|---|---|---|---|
| 6,091,775 | A | 7/2000 | Hibi et al. |
| 6,091,777 | A | 7/2000 | Guetz et al. |
| 6,195,680 | B1 | 2/2001 | Goldszmidt et al. |
| 6,366,614 | B1 | 4/2002 | Pian et al. |
| 6,389,473 | B1 | 5/2002 | Carmel et al. |
| 6,486,803 | B1 | 11/2002 | Luby et al. |
| 6,490,627 | B1 | 12/2002 | Karla et al. |
| 6,510,553 | B1 | 1/2003 | Hazara |
| 6,574,591 | B1 | 6/2003 | Kleiman et al. |
| 6,604,118 | B2 | 8/2003 | Kleiman et al. |
| 6,731,600 | B1 | 5/2004 | Patel et al. |
| 6,732,183 | B1 | 5/2004 | Graham |
| 6,968,387 | B2 | 11/2005 | Lanphear |
| 7,075,986 | B2 | 7/2006 | Girod et al. |
| 7,096,271 | B1 | 8/2006 | Omoigui et al. |
| 7,349,976 | B1 | 3/2008 | Glaser et al. |
| 7,408,984 | B2 | 8/2008 | Lu et al. |
| 8,752,085 | B1 | 6/2014 | Brueck et al. |
| 8,789,090 | B1 | 7/2014 | Brueck et al. |
| 2002/0073167 | A1 | 6/2002 | Powell et al. |
| 2002/0144276 | A1 | 10/2002 | Radford et al. |
| 2002/0174434 | A1 | 11/2002 | Lee et al. |
| 2002/0188745 | A1 | 12/2002 | Hughes et al. |
| 2003/0005455 | A1 | 1/2003 | Bowers |
| 2003/0067872 | A1 | 4/2003 | Harrell et al. |
| 2003/0081582 | A1 | 5/2003 | Jain et al. |
| 2003/0107994 | A1 | 6/2003 | Jacobs et al. |
| 2003/0135631 | A1 | 7/2003 | Li et al. |
| 2003/0151753 | A1 | 8/2003 | Li et al. |
| 2003/0152036 | A1 | 8/2003 | Quigg Brown et al. |
| 2003/0204519 | A1 | 10/2003 | Sirivara et al. |
| 2004/0003101 | A1 | 1/2004 | Roth et al. |
| 2004/0030797 | A1 | 2/2004 | Akinlar et al. |
| 2004/0031054 | A1 | 2/2004 | Dankworth et al. |
| 2004/0054551 | A1 | 3/2004 | Ausubel et al. |
| 2004/0071209 | A1 | 4/2004 | Burg et al. |
| 2004/0093420 | A1 | 5/2004 | Gamble |
| 2004/0143672 | A1 | 7/2004 | Padmanabham et al. |
| 2004/0170392 | A1 | 9/2004 | Lu et al. |
| 2005/0108414 | A1 | 5/2005 | Taylor et al. |
| 2005/0123058 | A1 | 6/2005 | Greenbaum et al. |
| 2007/0024705 | A1 | 2/2007 | Richter et al. |
| 2007/0244929 | A1 | 10/2007 | Huang et al. |
| 2007/0277219 | A1* | 11/2007 | Toebes et al. ................ 725/139 |
| 2008/0028428 | A1 | 1/2008 | Jeong et al. |
| 2008/0056373 | A1 | 3/2008 | Newlin et al. |
| 2008/0127244 | A1* | 5/2008 | Zhang .......................... 725/32 |
| 2008/0162713 | A1 | 7/2008 | Bowra et al. |
| 2008/0195744 | A1 | 8/2008 | Bowra et al. |
| 2008/0195745 | A1 | 8/2008 | Bowra et al. |
| 2012/0047542 | A1* | 2/2012 | Lewis et al. ..................... 725/97 |
| 2012/0124618 | A1* | 5/2012 | Ruiz-Velasco et al. ......... 725/32 |
| 2013/0086601 | A1* | 4/2013 | Adimatyam et al. ............. 725/1 |
| 2014/0259048 | A1 | 9/2014 | Brueck et al. |

FOREIGN PATENT DOCUMENTS

| | | |
|---|---|---|
| EP | 0919952 A1 | 6/1999 |
| EP | 1641271 A2 | 3/2006 |
| EP | 1670256 A2 | 6/2006 |
| EP | 1777969 A1 | 4/2007 |
| WO | 0067469 | 11/2000 |

OTHER PUBLICATIONS

On2 Technologies, Inc. "TrueMotion VP7 Video Codec", White Paper, Document Version 1.0, Jan. 10, 2005, (13 pages).

Intelligent Streaming, Bill Birney, May 2003, pp. 6 total.

Albanese, Andres, et al. "Priority Encoding Transmission", TR-94-039, Aug. 1994, 36 pages, International Computer Science Institute, Berkeley, California.

Puri, Rohit, et al. "Multiple Description Source Coding Using Forward Error Correction Codes", Oct. 1999, 5 pages, Department of Electrical Engineering and Computer Science, University of California, Berkeley, California.

Pathan, Al-Mukaddim, et al., "A Taxonomy and Survey of Content Delivery Networks", Australia, Feb. 2007. Available at http://www.gridbus.org/reports/CDN-Taxonomy.pdf.

Pantos, E.R. (Oct. 15, 2012). HTTP Live Streaming, download from http://tools.ietf.org/html/draft-pantos-http-live-streaming, 74 pages.

USPTO Non-final Office Action for U.S. Appl. No. 13/764,563 mailed Oct. 2, 2013.

USPTO Notice of Allowance for U.S. Appl. No. 13/764,563 mailed Jan. 30, 2014.

USPTO Non-final Office Action for U.S. Appl. No. 13/764,563 mailed Sep. 30, 2013.

USPTO Notice of Allowance for U.S. Appl. No. 13/764,563 mailed Jan. 16, 2014.

Non-final Office Action for U.S. Appl. No. 13/764,536 mailed Oct. 2, 2013 (10 pages).

Notice of Allowance for U.S. Appl. No. 13/764,536 mailed Jan. 30, 2014 (8 pages).

Non-final Office Action for U.S. Appl. No. 13/764,563 mailed Sep. 30, 2013 (11 pages).

Notice of Allowance for U.S. Appl. No. 13/764,563 mailed Jan. 16, 2014 (8 pages).

* cited by examiner

ADVERTISEMENT INSERTION INTO MEDIA CONTENT FOR STREAMING

RELATED APPLICATIONS

This application claims the benefit of U.S. Provisional No. 61/598,519, filed Feb. 14, 2012, the entire contents of which are incorporated by reference. This application is related to U.S. Ser. No. 13/764,536, and U.S. Ser. No. 13/764,563, filed concurrently with the present application. The entire contents of which are incorporated by reference.

TECHNICAL FIELD

Embodiments of the present invention relate to the field of delivery of media content over a network. Specifically, the embodiments of the present invention relate to advertisement insertion into streaming media content.

BACKGROUND

The Internet is becoming a primary method for distributing media content (e.g., video and audio or just audio or just video) and other information to end users. It is currently possible to download music, video, games and other media information to computers, cell phones, and virtually any network capable device. The percentage of people accessing the Internet for media content is growing rapidly. The quality of the viewer experience is a key barrier to the growth of video viewing on-line. Consumer expectations for online video are set by their television and movie viewing experiences.

Audience numbers for streaming video on the web are rapidly growing, and there are a growing interest and demand for viewing video on the Internet. Streaming of data files or "streaming media" refers to technology that delivers sequential media content at a rate sufficient to present the media to a user at the originally anticipated playback speed without significant interruption. Unlike downloaded data of a media file, streamed data may be stored in memory until the data is played back and then subsequently deleted after a specified amount of time has passed.

The process for preparing media content for adaptive streaming typically involves taking a source file, such as a movie, or a source feed, such as a broadcast signal, and splitting it into temporal chunks or slices of media (e.g., video and audio), and encoding each slice of the media at different quality levels. Typically the different quality levels are achieved by encoding the media content at different bit rates according to encoding profiles. During playback, and as network conditions fluctuate, a consuming application selects a slice at one of the different quality levels that is best suited for the present network throughput, and the consuming applications adjusts the quality up or down as available bandwidth increases or decreases by selecting subsequent slices at the appropriate quality levels.

Streaming media content over the Internet has some challenges, as compared to regular broadcasts over the air, satellite or cable. Although the adaptive streaming approach provides many advantages, one major disadvantage is inserting advertisements. Conventionally, in the case of live broadcast television, the broadcaster is in complete control of timing of the insertion and playback of advertisements. For example, if a 30-second advertisement is to be inserted, the advertisement is selected and scheduled beforehand, and the advertisement starts and ends immediately at the scheduled time. This is possible because the broadcaster is in complete control of all the equipment and media content (regular programming plus advertisements) involved. In addition, all viewers see or hear the same advertisement at the same time. The viewers are human beings who watch or listen to the media content using a television or radio. When the time to insert an advertisement arrives, the broadcaster inserts an advertisement into the output signal. The advertisement includes content which was previously positioned in the video equipment, which is capable of delivering the content into the output signal at the precise instant that it is called for, with very high reliability. In effect, all viewers see the same advertising at the same point in the media content, such as that of a live event or a scheduled programming.

As for Internet-based media content, one conventional approach inserts advertising into the video stream at some point no later than the media server or the equivalent, meaning the advertisements are encoded as an integral part of the media content. Like conventional broadcasting, using this conventional approach, all viewers see the same advertising at the same point in the media content, such as that of a live event, and a media player, operating on a networked device, is not involved in selecting the advertisements. The media player is a piece of software that plays the media content (e.g., displays video and plays audio), and may be a standalone software application, a web browser plug-in, a combination of browser plug-in and supporting web page logic, or the like.

In the case of managing advertisements for on-demand, Internet-based media content, sometimes referred to as video-on-demand (VOD), the timing for advertisement insertion may be very flexible. For example, the VOD content may be a previously-recorded broadcast, as opposed to media content from a "live" broadcast. In this context, "live" means that the media content is anchored to a particular point in time for the purpose of playing the media content. That is, the beginning of the piece of content is scheduled to be played by a media player at a particular point in time. In some cases, the media content of the live event is played out at the same time that the content is being encoded, and the anchor point is the time that the encoding of the event began. In other cases, the media content of a live event may be pre-encoded, but scheduled to play out at a particular point in time. In either case, the playback of the content is required to occupy approximately the same amount of time as the original live event, in order to keep the playback of the media content synchronized with the schedule. For live playback, the duration of advertisement breaks during playback should approximate the duration of the advertisement breaks as they were encoded. Live playback (sometimes referred to as live playout) differs from VOD playback in that, with VOD content, there is no anchor point in real time. A piece of VOD content begins playing when a viewer requests the VOD content. There is no requirement that the duration of advertisement breaks be the same as the duration of the original advertisement breaks, during the playback of the VOD content. In fact, it is common for the duration of the advertisement breaks to be quite different in the VOD content than from the original broadcast (e.g., for television). For example, an original television broadcast may be shown at a particular point in time, and subsequently, the publisher makes the television broadcast available as VOD content, but without the original advertisements in the original television broadcast. Since the VOD content is not anchored to a particular schedule, the advertisements in the VOD content do not have to match the duration of the original advertisements.

For VOD advertisement insertion, advertisement breaks are typically marked at particular points in the video content, although their locations might also be computed based on the amount of time the viewer has been viewing or by some other means. Advertisement breaks are not required to occupy any particular duration of time. In particular, the advertisements in the VOD content do not have to match the original advertisement breaks in the program content. In fact, the number and duration of advertisements played during a particular advertisement break in the VOD content may vary from viewer to viewer.

For VOD advertisement insertion, when playback reaches an advertisement break, playback of the program content is suspended while the advertisements are played. If there are brief pauses as advertisements are fetched, or even during the playback of an advertisement, the viewer's experience during the advertisement break may be affected, but this has no bearing on the viewer's experience after the program content resumes. For example, in a VOD scenario, there is no concept of "lag behind live," because the event is pre-recorded and is available in its entirety before playback begins. The term "lag behind live," as used herein, refers to the difference between when a particular piece of content is encoded for Internet distribution and when a particular viewer views the piece of content on the media player. The "lag behind live" can vary between viewers and can vary over time for a single viewer. For a particular live event, delivered by a particular technology, there is a minimum lag behind live due to the time to record, or otherwise capture the live event and to make the recorded content available for Internet distribution, for example.

The concept of "lag behind live" only applies to live events, not to pre-recorded media content, unless the pre-recorded media content is scheduled to be played back at a particular point in time. In effect, for VOD content, there is no live point to which the viewer should be restored after an advertisement break. Advertisement breaks for VOD content can be of any duration without affecting the viewer's experience of the regular program content.

Since advertising is inserted into the live video stream of a live event before the media server in one conventional system, all viewers seeing the live event see the same advertisement at the same time. The publisher cannot control how many viewers see the advertisements. In general, there is no good way to take advantage of knowing how many viewers see the advertisements. In particular, it is difficult or impossible to be paid a higher price if a higher-than-expected number of viewers see the advertisements. It is difficult or impossible to target advertising to particular demographics or geographic areas without setting up a one or more media servers for each demographic or geographic area and ensure that each viewer connects to the appropriate media server.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
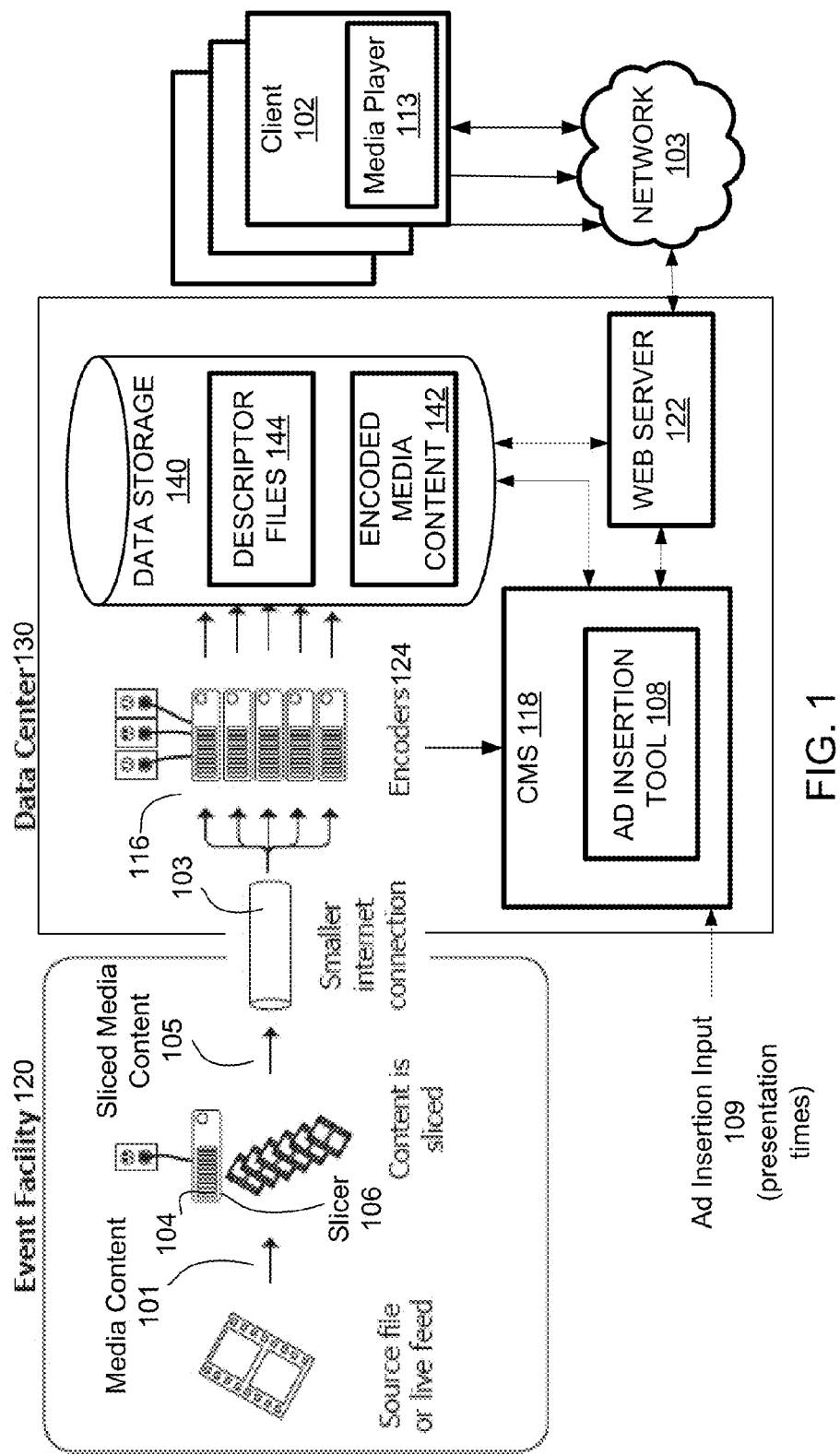
FIG. 1 is a block diagram of exemplary network architecture in which embodiments of an advertisement insertion tool may operate.

A method and system for advertisement insertion into media content for streaming is described. In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "communicating," "capturing," "executing," "defining," "specifying," "creating," "recreating," "processing," "providing," "computing," "calculating," "determining," "displaying," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs and magnetic-optical disks, read-only memories (ROMs), random access memories (RAMs), EPROMs, EEPROMs, magnetic or optical cards, or any type of media suitable for storing electronic instructions.

FIG. 1 is a block diagram of exemplary network architecture 100 in which embodiments of an advertisement insertion tool 108 may operate. The network architecture 100 may include multiple client computing systems 102, a computing system 104, and one or more server computing systems 116, such as at a data center 130 coupled via a data communications network 103 (e.g., public network such as the Internet or private network such as a local area network (LAN)). In the depicted embodiment, the media content 101 is captured at an event facility 120 and fed into the computing system 104 that uses a slicer 106 to slice the media content 101 into sliced media content 105. In one embodiment, the media content 101 is a content file. The content file may include data corresponding to video and/or audio corresponding to a television broadcast, sporting event, movie, music, concert or the like. The original content file may include uncompressed video and audio, or alternatively, uncompressed video or audio. Alternatively, the content file may include compressed content (e.g., video and/or audio) using standard or proprietary encoding schemes. The original content file from the publisher may be digital in form and may include media content having a high bit rate, such as, for example, 2 Mbps or greater. In another embodiment, the media content 101 may be a feed. The feed may include data corresponding to video and/or audio.

In one embodiment, the slicer 106 may be a lightweight piece of software that runs on the computing system 104 near the signal source (e.g., source file or live feed), such as a laptop computer at the live event or at a publisher's facility. The slicer 106 divides the media content 101 into the temporal chunks (sliced media content 105) and pushes each slice to a remote server computing system 116 in the data center facility 130. The server computing systems 116 may be one or more encoders 124 that can process the individual slices. For example, the encoders 124 may retrieve a slice, encode the slice according to the multiple quality levels, and store them in the data storage 140 as encoded media content 142 to be delivered to the one or more clients 102 via a web server 122, for example, using adaptive streaming techniques.

In this embodiment, the process of dividing a signal into temporal slices is decoupled from the work of encoding the slices to the various bitrates and delivering them using the web server 122. Because the slicer 106 is not doing the work of encoding to the many output formats, it does not need large amounts of computing hardware to run, so there are not large space and electricity requirements at the event facility 120. There only needs to exist sufficient computing hardware to capture the live signal (or source file) and divide it into the temporal slices. It is feasible that this slicing could even be performed on a mobile device with a camera, such as on the iPhone® mobile digital device. Alternatively, other types of portable or non-portable computing devices may be used to capture the signal source, or receive the signal source from another capture device, and slice the signal before sending to the data center for encoding as would be appreciated by one of ordinary skill in the art having the benefit of this disclosure.

In other embodiments, the encoders 124 could be employed at the event facility 120 and stored in the data storage 140 for delivery via the web server 122 as described below. For example, in one embodiment, the live signal is fed into encoding computers at the live event. These encoding computers divide the signal into temporal slices, encode the slices to the various bitrates and upload them to a remote web server. One of these other embodiments may use a specialized delivery mechanism, like a microwave or satellite link to deliver the encoded media content to the data center 130. However, in the decoupled encoding embodiment described above, because the slicer 106 acquires the signal and creates the temporal slices for delivery to the data center over the Internet, the specialized delivery mechanism is not required. Instead, the slices can be delivered over a normal Internet connection because there is only a single slice per range of time rather than many versions of the slices encoded at the various bitrates. Also, in the data center 130, no specialized receiving hardware is required, because the slices from the slicer 106 are received over a standard internet connection. Encoders 124 in the data center process the slices individually, create the encoded slices at the various bitrates, and store them to the data storage 140 for delivery via the web server 122. Of course, the encoded media content 142 may be delivered to the clients 102 using more than one web servers 122 at one or more locations as would be appreciated by one of ordinary skill in the art having the benefit of this disclosure.

In one embodiment, the web server 122 receives requests for encoded media content 142 over the network 103 from media players 113 executing on the client computing systems 102 (referred to herein as the "client"). The client 102 and the web server 122, which may be executed on a server of a content delivery network, may be coupled by the network 103. The network 103 may include the Internet and network connections to the Internet. Alternatively, the web server 122 and the client 102 may be located on a common Local Area Network (LAN), Personal area network (PAN), Campus Area Network (CAN), Metropolitan area network (MAN), Wide area network (WAN), wireless local area network, cellular network, virtual local area network, or the like. The client 102 may be a client workstation, a server, a computer, a portable electronic device, an entertainment system configured to communicate over a network, such as a set-top box, a digital receiver, a digital television, a mobile phone or other electronic devices. For example, portable electronic devices may include, but are not limited to, cellular phones, portable gaming systems, portable computing devices or the like. The client 102 may have access to the Internet via a firewall, a router or other packet switching devices. The server computing systems 116 may be a network appliance, a gateway, a personal computer, a desktop computer, a workstation, etc.

In one embodiment, the computing environment 100 also includes one or more content repositories, illustrated as a data storage device 140. The data storage device 140 may be a content repository in which encoded media content 142 may be stored. A publisher or a distributor of media content may store the encoded media content 142 in the data storage 140. Media content from the publisher may be transferred over the network 103 to the data storage 140 and served by the web server 122 (sometimes referred to as the origin content server). In one embodiment, the web server 122 delivers the media content to the client 102, which is configured to play the content on a media player 113 executing by a processing device of the client 102. The web server 122 delivers the media content by streaming the media content to the client 102. In a further embodiment, the client 102 is configured to receive different portions of the media content from multiple locations.

In other embodiments, the encoded media content 142 from the web server 122 may be replicated to other locations and served to the clients 102 using other web servers 122 located on other server computing system. Alternatively, proxy cache servers can be used. For example, the client 102 may request and receive content from any of the multiple web servers 122, or proxy cache servers. In a further embodiment, the encoded media content 142 may be forwarded directly to the other web servers 122 or proxy cache servers through direct communication channels without the need to traverse the Internet. In another embodiment, the origin content server (web server 122), other web servers 122 and proxy cache servers may be organized in a hierarchy of a CDN to deliver the media content to the client 102. A CDN is a system of computers networked together across the Internet that cooperates transparently to deliver content. In the depicted embodiment, the web server 122 is executed on an origin content server. Alternatively, the web server 122 may be executed on one or more other servers to deliver the encoded media content 142. The CDN may also include interconnected computer networks or nodes to deliver the media content.

In the depicted embodiment, the data center 130 includes a content management system (CMS) 118 that manages the encoded media content 142, for example, using a database stored in data storage 140. In one embodiment, the CMS 118 is a computing system including a memory and a processing device coupled to the memory, the processing device to execute the advertisement insertion tool 108. In another embodiment, the advertisement insertion tool 108 can be executed by a processing device of a computing system that is separate from the CMS 118. The CMS 118 may also manage the available encoded media content 142 using one or more descriptor files 144. In the depicted embodiment, the publisher (or server administrator) can create metadata descriptor files 144 using the CMS 118. The metadata descriptor files 144 can be fetched or pushed to the media player(s) 113. In one embodiment, the metadata descriptor file 144 is M3U file. A M3U file is a computer file format that stores media playlists. Typically, a M3U file is a plain text file that specifies the locations of one or more media files. Each entry of the M3U file carries one specification, which can be an absolute local pathname, a local pathname relative to the M3U file location, or a URL (both absolute and relative URLs). The M3U file can also include comments, which are prefaced by the '#' character. In extended M3U, the "#" character may also introduce extended directives. The Unicode version of M3U is M3U8, which uses UTF-8 Unicode characters.

In one embodiment, the metadata descriptor file 144 gives an overview of the content and is initially requested by the media player 113 in order to know how to request specific files or data ranges within a file. For example, a user may visit a webpage with a link to the video to be streamed. When the link is activated, the media player fetches the metadata descriptor file 144 to determine what quality levels are available and the locations of the corresponding files or data ranges within a single file for adaptive streaming. It should be noted that the web server sends transport stream files in response to the requests, however, the media content may be stored in one or multiple files. Regardless of how the media content is stored, the web server 122 sends the transport stream files with the corresponding slice of media content requested. When the media content is stored as discrete files, the web server may send the discrete file (encoded according to the appropriate quality profile) as the transport stream file in response to the request. However, when the media content is stored a single file, an identifier and an offset may be used to retrieve the appropriate slice of the file (encoded according to the appropriate quality profile), and the web server 122 can send this slice as a transport stream file in response to the request.

In one embodiment, the M3U8 file is created with the available quality profiles and where the media content at those profiles are located even though the media content at those different profiles. The media player 113 reads the descriptor file 144 for the media content that is being requested. The metadata descriptor file 144 may also include a unique content identifier (UCID), duration of the media content, available quality profiles and locations of where the media content can be retrieved. The quality profiles may specify parameters, such as width and height of the image (i.e., image size), video bit rate (i.e., rate at which the video is encoded), audio bit rate, audio sample rate (i.e., rate at which the audio is sampled when captured), number of audio tracks (e.g., mono, stereo, or the like), frame rate (e.g., frame per second), staging size, or the like. For example, the media players 113 may individually request different quality levels of the same media content; for example, different media players 113 may request the same portion (e.g., same time index) of the media content but at different quality levels. For example, one media player may request a slice having HD quality video, since the computing device of the requesting media player has sufficient computational power and sufficient network bandwidth, while another media player may request a slice having a lower quality, since its computing device may not have sufficient network bandwidth, for example. In one embodiment, the media player 113 shifts between quality levels at the slice boundaries by requesting slices from different copies (e.g., different quality streams) of the media content. Alternatively, the media player 113 can request the slices using other techniques that would be appreciated by those of ordinary skill in the art having the benefit of this disclosure. The metadata descriptor file 144 may also include other metadata, including, for example, air date of the content, title, actresses, actors, a start index, an end index, proprietary publisher data, encryption level, content duration, episode or program name, publisher; available tools for the end-user navigational environment, such as available menus, thumbnails, sidebars, advertising, fast-forward, rewind, pause, and play, or the like; or bit-rate values, including frame size, audio channel information, codecs, sample rate, and frame parser information. In another embodiment, other types of publishing systems other than CMS 118 may be used to create the metadata descriptor files 144. Also, the CMS 118 may be hosted on another computing system within the data center 130 or outside of the data center 130. For example, the data center 130 may be a cloud computing service provided by a third-party service provider and the CMS 118 is executed on a computing device that can access the cloud computing service over a public or private network.

The CMS 118 may also allow a publisher to indicator where advertisements can be inserted into the encoded media content 142 for streaming. In one embodiment, the CMS 118 receives advertisement insertion input 109, such as indications of the presentation times of when advertisements should start and end or when the advertisements start and their duration. The advertisement insertion tool 108 may be software that executes on the CMS 118 and uses the advertisement insertion input 109 to insert advertisements into the streaming encoded media content 142. Details regarding the operation of the advertisement insertion tool 108 are described below with respect to FIGS. 2-3B.

In one embodiment, the CMS 118 can use the advertisement insertion tool 108 to create new slices to accommodate an advertisement inserted at presentation time that does not necessarily align with the slice boundaries. The advertisement insertion process can be done on the slices before encoding by the encoder 124 or after encoding as would be appreciated by one of ordinary skill in the art having the benefit of this disclosure. The slices may have an equal duration, or alternatively, the slices may have equal file sizes, or vary one to another according to other requirements. During operation, as describe in more detail below, each portion of the encoded media content 142 may be retrieved, decoded and re-encoded into an encoded representation of that portion of the media content at the specified quality level. Typically, in adaptive streaming, a media content file can be encoded into multiple encoded representations according to different quality profiles and stored as separate files that are independently requestable from the data storage 140 via the web server 122. However, in the embodiments described herein, the media content can be stored in the data storage 140 and encoded at the requested quality level, and the advertisement insertion tool 108 can be used to insert advertisements into the streaming media content that is being played back on the media player 113. It should be noted that the advertisements can be added and encoded into the encoded media content 142 so that the advertisement is part of the stream itself. In other embodiments, the advertisements are inserted into the descriptor files and the slices are updated to accommodate advertisements at the designated locations. It should be noted that the duration of the set of one or more advertisements inserted into a stream can match the duration of a set of original advertisements or can be shorter or longer than the duration of the set of original advertisements. Also, when the stream does not have any original advertisements, the set of one or more advertisements being inserted can have any duration. Also, the actual advertisements and the duration of these advertisements can vary for the requesting users. For example, one advertisement may be streamed to a first media player when reaching an advertisement marker in the streaming content and another advertisement may be streamed to a second media player reaching the same advertisement marker in the streaming content. The decision(s) of which advertisement is streamed may be based on various factors, including geography, user profile, or the like.

In other embodiments, the computing environment 100 may include other devices, such as directory servers, Digital Rights Management (DRM) servers, statistic servers, devices of a network infrastructure operator (e.g., an ISP), or the like.

In one embodiment, the same server computing system 116 may execute the web server 122 and the advertisement insertion tool 108, which is described in more detail below. Alternatively, the functionality of the advertisement insertion tool 108 and the web server 122 can be distributed over the two machines. For example, in one embodiment, the server computing system 116 may host just the advertisement insertion tool 108 and not the web server 122, and another server computing system (not illustrated) can host the web server 122 to handle requests for the media content. Alternatively, other configurations are possible as would be appreciated by one of ordinary skill in the art having the benefit of this disclosure.

This descriptor file 144 permits the media player 113 to request the slices, and the advertisement insertion tool 108 handles creating the new or modified slices to accommodate the inserted advertisements for delivery to the media player 113. From the media player's perspective, the media player 113 requests the slices according to the descriptor file 144, which has been updated to include the advertisements or indications on when advertisements are to be played back during streaming of the slices.

Figure 2:
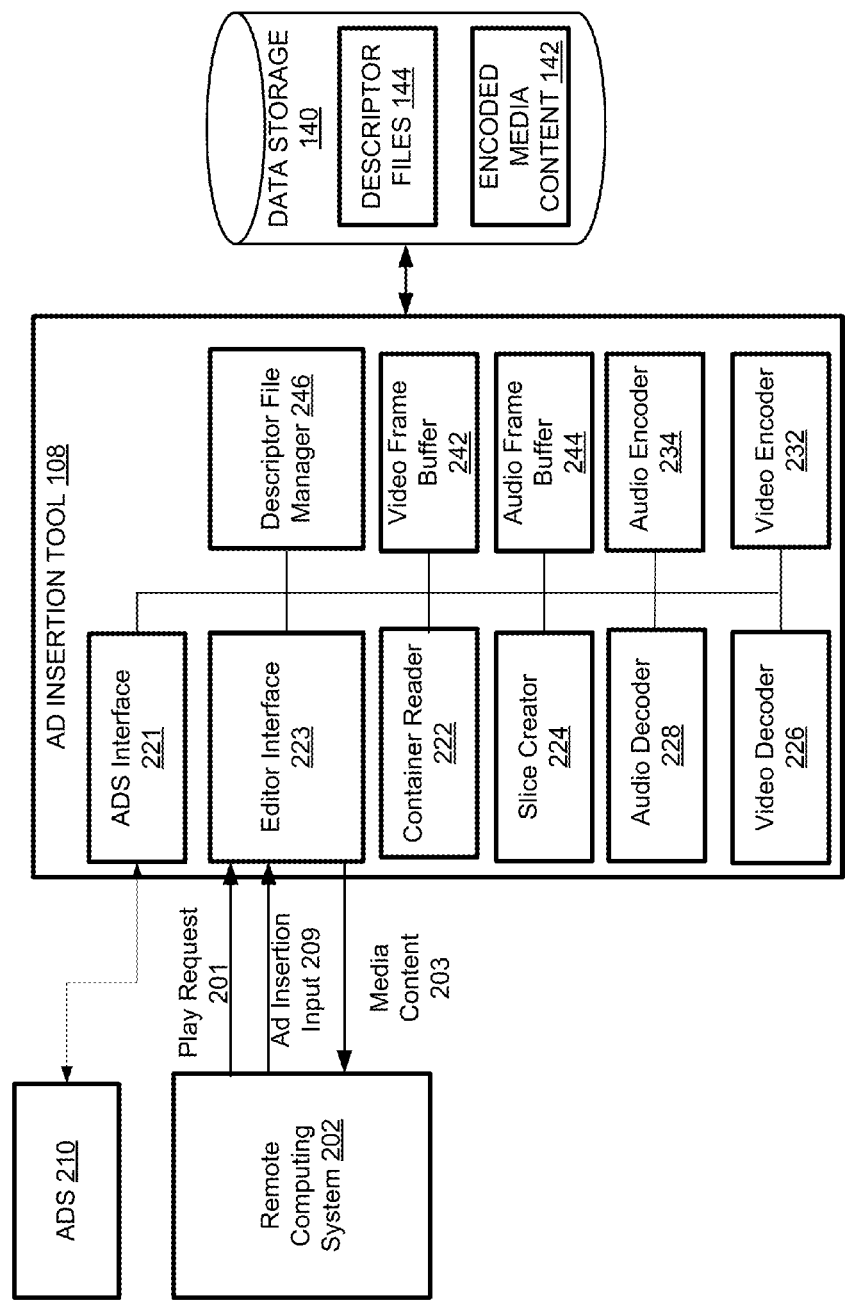
FIG. 2 is a block diagram of the advertisement insertion tool to insert advertisements into media content for streaming according to one embodiment.

FIG. 2 is a block diagram of the advertisement insertion tool 108 to insert advertisements into media content for streaming according to one embodiment. The advertisement insertion tool 108 may include an Advertisement Decision Service (ADS) interface 221 that communicates with an ADS 210, a container reader 222, an editor interface 223, a slice creator 224, an audio decoder 228, a video decoder 226, a video encoder 232, an audio encoder 234, a video frame buffer 242, an audio frame buffer 244, and a descriptor file manager 246.

In the depicted embodiment, the ADS 210 is an external service running on a remote computing system accessible over the Internet. The ADS 210 selects the advertisement to play from an inventory of available advertisements (e.g., advertisement impressions). The inventory may represent the advertisements which the publisher of the media content has sold to advertising customers. Rules in the ADS 210 may influence the selection of an advertisement from the inventory. The rules may take into account information supplied in a request by a media player 113, such as the local time of player, keywords, the geographic location of the media player (e.g., determined by the host's IP address), demographics of the viewer (user of the media player), and the like. These rules and others would be appreciated by one of ordinary skill in the art, and as such, additional description of these rules has not been included. In one embodiment, when the media player 113 requests the advertisement decision, as indicated in the descriptor file, the advertisement insertion tool 108 may receive the request from the media player 113, request the advertisement from the ADS 210 and return the identity of the advertisement to be displayed to the requesting media player 113. Alternatively, the media player 113 can request the advertisement from the ADS 210 without using the advertisement insertion tool 108. Each individual media player 113 may potentially receive a different advertisement response for the same advertisement opportunity (e.g., the scheduled advertisement break). After the advertisement is selected in this fashion, the media player 113 fetches and plays the advertisement.

In one embodiment, the content server stores the available advertisements, and the media player 113 requests the selected advertisements before the advertisement break. In another embodiment, the media player 113 stores the available advertisements. Alternatively, the available advertisements are stored and retrieved over the Internet from servers that are distinct from the media player computer and the computing system hosting the ADS 210. In one embodiment, the ADS 210 supports an interface that receives the duration of the advertisement break from the media player 113 and/or any targeted-advertisement information, and returns the identities of advertisement(s) that should be requested by the media player 113 to fill the advertisement break. In other cases, the media player 113 determines the number and durations of the one or more advertisements selected to fill the scheduled advertisement break, and makes individual requests for the one or more advertisements of the appropriate durations from the ADS 210, or elsewhere. Alternatively, other techniques for advertisement selection could be implemented, for example, the ADS 210 may be implemented within the media player 113, or within the content server. Alternatively, the selection of advertisements may be done using other techniques than using the ADS 210. The details of how advertisements could otherwise be selected to fill an advertisement break would be appreciated by one of ordinary skill in the art, and accordingly, a detailed description of such has not been provided. It should be noted that the embodiments of FIG. 2 describe advertisement insertion into streaming video. Alternatively, advertisement insertion may be performed by the media player 113 that is configured to receive the live media content using other delivery methods than streaming.

In the depicted embodiment, the editor interface 223 communicates with a remote computing system 202 operated by a publisher or editor of the encoded media content. For example, an editor of the content can send a play request 201 to the advertisement insertion tool 108 via the editor interface 223 in order to playback the media content to select points to insert advertisements. In response to the play request 201, the advertisement insertion tool 108 sends the appropriate media content 203 to the remote computing system 202. The editor may use a software tool on the remote computing system 202 to select the points in the media content where advertisements should be inserted. The remote computing system 202 sends an advertisement insertion input 209 to the advertisement insertion tool 108 via the editor interface 223. The advertisement insertion input 209 may include a presentation time of when the advertisement should be inserted. For example, the advertisement insertion input 209 may specify a presentation time for a start of an advertisement and a presentation time for an end of the advertisement. Alternatively, the advertisement insertion input 209 may specify a presentation time and a duration of an advertisement. The advertisement insertion tool 108 uses the input 209 to create new slices in the encoded media content 142 to accommodate advertisement insertion of an advertisement. The advertisement insertion tool 108, using the slice creator 224, creates the new slices in the encoded media content 142, and updates the descriptor file(s) 144) using the descriptor file manager 246 as described herein.

In the depicted embodiment, the container reader 222 can be used to read containers of the media content 142. For example, the media content file may be an MP4 file, and the MP4 file is the container that stores metadata and the actual audio and video samples. The actual audio and video samples have been encoded using a codec, such as AAC, H264 or the like. Using the container reader 222, the advertisement insertion tool 108 can read the metadata information from the container. Reading metadata information from the container is not a computationally intensive operation as compared to decoding the audio and video samples.

In one embodiment, using the container reader 222, the advertisement insertion tool 108 can scan the media content file, looking for all the video key frames, for example. The advertisement insertion tool 108 may read the encoded media content 142, using the container reader 222 without actually decoding the encoded video frames and the encoded audio samples. In effect, the container reader 222 can read a container (sometimes called a wrapper) to obtain metadata information, and can read the pass the video and audio samples to the decoder, but instruct the decoder not to decode, for example, to determine which video frames are key frames without using the computational resources to decode the actual video frames. Alternatively, the encoded video frames and audio samples can be discarded before being sent to the decoders when locating particular key frames.

The container reader 222 may read the container, such as the AVI container or MP4 container (or other types of containers, such as MP3, MKV, or the like), and may output the encoded video frames and the encoded audio samples, as well as any other metadata information in the container. For example, an MP4 container may indicate that there are 2 media tracks in this file, one being video the other audio, that the video is H264 encoded, and the audio is AAC in stereo. When the container reader 222 outputs the frames and samples, the advertisement insertion tool 108 can determine the track of the frame or sample, whether it is audio or video. The video frames being output may also include a flag that indicates that it is a key frame. The advertisement insertion tool 108 can identify the type and duration of the samples and frames, including the presentation times and durations of the key frames of the media content. For example, the advertisement insertion tool 108 can determine that a video frame has a presentation time of 20.2 seconds from the beginning and it is a key frame and that the corresponding audio has 1024 audio samples. Although the actual data has not been accessed yet, the output of the container reader 222 may be split into two different pipelines, one pipeline for the audio codec (audio decoder 228), and the other for the video codec (video decoder 226). The decoders, when instructed to decode, output the raw video frame and the raw audio samples into the video frame buffer 242 and the audio frame buffer 244, respectively. Thus, the advertisement insertion tool 108 can instruct the decoders to not decode the video frames and the audio samples when performing the pre-processing of the media content. However, when needed to create a new slice, for example, the advertisement insertion tool 108 can instruct the decoders to decode the video frames and the audio samples so that the video frames and audio samples can be re-encoded in the new slices. In another embodiment, the advertisement insertion tool 108 may be configured to not send the video frames and audio samples to the decoders when performing the pre-processing of the media content. In another embodiment, the advertisement insertion tool 108 may be configured to instruct the decoders to discard the video frames and audio samples. Alternatively, the advertisement insertion tool 108 can use a series of commands to turn the decoders on and off. When the decoders are off the video frames and audio frames may be passed through without being decoded and then subsequently discarded. Alternatively, the container of the slice may already contain an index of where the video key frames are located within the slice. For example, this index can be created when adding the media content file to the content library or at a time before receiving requests from clients. Alternatively, this index can be created at the time of receiving the request "on the fly," if not previously processed. The advertisement insertion tool 108 can use the index in order to create one or more new slices in the encoded media content 142 to accommodate advertisement insertion of an advertisement, as well as to update the descriptor file(s) 144.

The key frames have a corresponding time stamp and the advertisement insertion tool 108 can use the time stamps of the key frames to determine the relation between the key frames. For example, if there is a first key frame at 15 seconds into the media content and a second key frame is at 33 seconds, and a 15-second advertisement is to be inserted at 20 seconds, the advertisement insertion tool 108 can create a new slice that includes the media content up to the 20 seconds, and can create a second new slice to transition back to the media content after the advertisement, as described below with respect to FIGS. 4A-4C. For example, if advertisement is to be inserted into a slice that contains the 20 second mark, the new slice could contain the media content up to the 20 second mark, and the frame after the 20 second mark could be converted into a new key frame to create a new slice for playback after the advertisement insertion. In this embodiment, the advertisement insertion tool 108 can start reading back at the key frame at the 15 seconds in order to decode the video and audio samples up to the 20 seconds to convert the frame at 20 seconds into a key frame for the new slice. The advertisement insertion tool 108, using the video decoder 226 and audio decoder 228, decodes the encoded video frames and the encoded audio samples to generate the raw video and the raw audio, respectively. These samples are stored in the video frame buffer 242 and audio frame buffer 244. The advertisement insertion tool 108 can discard the samples that are outside the time ranges of the new slices. The advertisement insertion tool 108, using the video encoder 232, encodes the raw video (for the pertinent time range) into encoded video frames, and, using the audio encoder 234, encodes the raw audio (for the pertinent time range) into encoded audio frames. The advertisement insertion tool 108 can instruct the video encoder 232 and the audio encoder 234 of the quality profile to be used for encoding the audio and video. The advertisement insertion tool 108, using the slice creator 224, creates the new slices having the encoded video frames and the encoded audio frames for the respective time ranges, and stores the encoded media content 142 into the data storage 140. After creation of the new slices, the advertisement insertion tool 108 can update the descriptor file 144 using the descriptor file manager 246 so that the media player requests the new slices and the advertisement. The updated descriptor files are described and illustrated in tables below.

It should be noted that the advertisement insertion tool 108 may be used in an adaptive streaming context, as well as other streaming contexts that are not adaptive streaming.

The video and audio stored in the buffers 242 and 244 can then be used to create a slice for the requested time range. In particular, the slice creator 224 can instruct the audio encoder 234 and video encoder 232 to encode the raw data into encoded audio frames and video frames for the slice. The advertisement insertion tool 108 can instruct the slice creator 224 to create the slice with the necessary encoded audio frames and video frames.

In another embodiment, when the first frame after the inserted advertisement is not a key frame, the advertisement insertion tool 108 can decode the frame as described above (decoding from the previous key frame and any intervening delta frames), and then re-encode this first frame as a key frame. The subsequent frames to this first frame may be able to be copied from the original data so that the advertisement insertion tool 108 does not have to re-encode the subsequent delta frames after the newly created key frame. This may speed up the operation, and may not lose any quality by re-encoding the video frames. Alternatively, the advertisement insertion tool 108 can re-encode all video frames again as would be appreciated by one of ordinary skill in the art having the benefit of this disclosure.

Figure 3A:
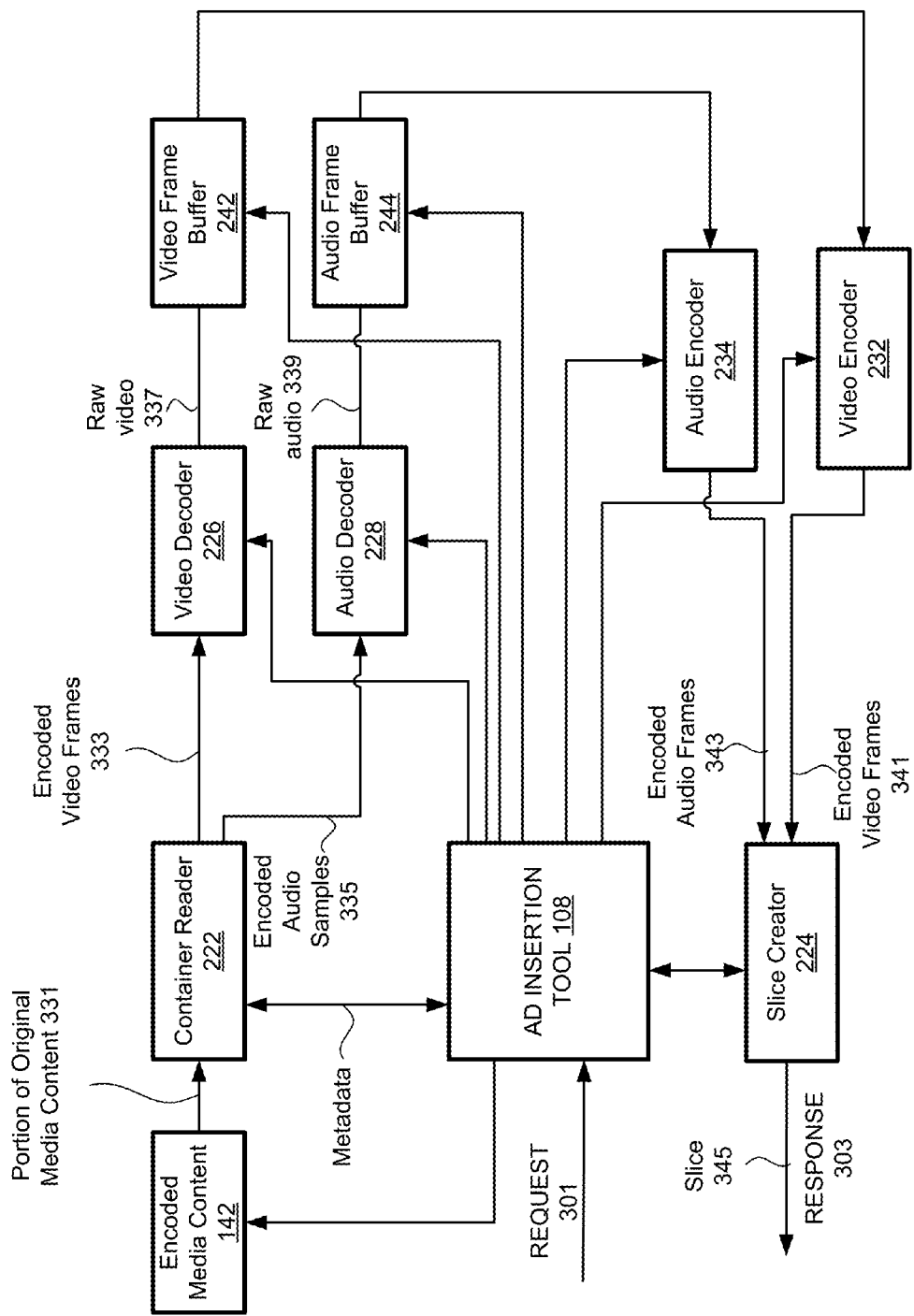
FIG. 3A is a diagram that illustrates a flow of operation of the advertisement insertion tool to create slices to accommodate advertisement insertions according to one embodiment.

FIG. 3A is a diagram that illustrates a flow of operation of the advertisement insertion tool to create slices to accommodate advertisement insertions according to one embodiment. Advertisement insertion, as used herein, refers to the process of preparing the stream(s) of the media content to insert one or more advertisements into the stream(s) for streaming. A single stream can be prepared for inserting one or more advertisements at one or more designated locations. Alternatively, multiple streams, such as different quality streams of the same media content, can be prepared for inserting one or more advertisements at one or more designated locations.

In one embodiment, when the advertisement insertion tool 108 receives an advertisement insertion request 301 for an encoded media content 142 (original content file), the advertisement insertion tool 108 can process the encoded media content 142. For example, the media content file may be an MP4 file. The MP4 file is the container that stores metadata and the actual audio and video samples. The actual audio and video samples have been encoded using a codec, such as AAC, H264 or the like. Using the container reader 222, the advertisement insertion tool 108 can read the metadata information from the container. Reading metadata information from the container is not a computationally intensive operation as compared to decoding the audio and video samples. Using the container reader 222, the advertisement insertion tool 108 can scan the media content file, looking for all the video key frames. In one embodiment, the advertisement insertion tool 108 can inspect one or more original slices to locate key frames and to create new slices to accommodate insertion of an advertisement at the desired presentation times as described in more detail below. In another embodiment, the advertisement insertion tool 108 creates an index of the media content file, and the video key frames can become index points. This index can be created when adding the media content file to the content library or at a time before receiving advertisement insertion requests 301 from a publisher. Alternatively, this index can be created at the time of receiving the advertisement insertion request 301 "on the fly," if not previously processed.

The key frames have a corresponding time stamp and the advertisement insertion tool 108 can use the time stamps of the key frames to determine the relation between the key frames. For example, if there is a key frame at 15 seconds into the media content and the second key frame is at 33 seconds, and an advertisement insertion request 301 comes in for inserting a 30-second advertisement at 25 seconds presentation time (referred to as the advertisement insertion point), the advertisement insertion tool 108 can start reading back at the key frame at the 15 seconds in order to decode the video and audio samples up to the 25 seconds so that the advertisement insertion tool 108 can create a new slice containing the media content between 15 seconds and 25 seconds. The advertisement insertion tool 108, using the video decoder 226 and audio decoder 228, decodes the encoded video frames 333 and the encoded audio samples 335 to obtain the raw video 337 and the raw audio 339, respectively. These samples are stored in the video frame buffer 242 and audio frame buffer 244. The advertisement insertion tool 108 can discard the samples that are after the presentation time for the new slice. In another embodiment, the advertisement insertion tool 108 does not decode the key frames and any intervening delta frames up to the advertisement insertion point; rather, the advertisement insertion tool 108 uses the data from the original slice and discards the remaining frames after the advertisement insertion point or marks these frames to be discarded when decoded. The frames after the advertisement insertion point can be used for creation of a second new slice (when no black frames are used in the media content to mark the advertisement insertion). The subsequent frame after the advertisement insertion point is converted into a key frame for the second new slice as described in more detail below.

In some embodiments, to create the first new slice, the advertisement insertion tool 108, using the video encoder 232, encodes the raw video 337 for the designated time range (e.g., 15-25 seconds) into encoded video frames 341, and, using the audio encoder 234, encodes the raw audio 339 for the designated time range (e.g., 15-25) into encoded audio frames 343. The advertisement insertion tool 108 can instruct the video encoder 232 and the audio encoder 234 of the quality profile to be used for encoding the audio and video. The advertisement insertion tool 108, using the slice creator 224, creates a slice 345 having the encoded video frames 341 and the encoded audio frames 343 for the designated time range, and stores the slice 345. In a further embodiment, a response 303 is sent to the requesting computer to indicate the new slices created for the advertisement insertion request 301. This information can be used to update the descriptor file 144 as described in more detail below.

In one embodiment, a new key frame may be created at the identified time index, even if the sample at that time was not a key frame previously. Continuing the example from above, the advertisement insertion tool 108, using the slice creator 224 may create a second new slice at 25 seconds with a key frame at 25 seconds. The second new slice can be played back after the advertisement so that presentation time may be changed from 25 seconds to 55 seconds, for example, when inserting a 30-second advertisement. The new slice 345 has a key frame in order for the media player 113 to be able to decode and play the media content after the advertisement insertion.

In another embodiment, the advertisement insertion tool 108, which can access the media content with random access, finds the video frame at the advertisement insertion point and creates two new slices; one slice before the advertisement insertion point and one slice after the insertion point. In another embodiment, the media content already contains black frames to designate where the advertisement is to be inserted in these cases, the first new slice is a portion of a first original slice before a start time of the black frames and the second new slice is a portion of a second original slice after an end time of the black frames. The creation of the second new slice allows the media content to resume after the insertion point with the first frame of the new slice being independently decodable. In another embodiment, the media content does not contain black frames, but rather includes original advertisements in an original feed. For example, an over-the-air TV feed may already have advertisements, but these advertisements were sold for over-the-air TV only. The advertisement insertion tool 108 can receive a signal indicating when the advertisement break starts and another signal indicating when the advertisement break ends. The advertisement tool 108 can truncate the current slice, discarding the video frames of the original advertisements until the signal indicating the end of the advertisement break is received, as described herein. At this point, the advertisement tool 108 starts with the next slice. In another embodiment, the advertisement insertion tool 108, using the index can go back to the most recent key frame previous in time than the advertisement insertion point in order to create the first new slice. The advertisement insertion tool 108 can also use the index to create the second new slice.

It should be noted that the advertisement insertion tool 108 may be used in an adaptive streaming context, as well as other streaming contexts that are not adaptive streaming. For example, if a user may be playing a video on a mobile phone while in transit. The media player on the mobile phone will retrieve the metadata descriptor file and determine what quality profiles are available for that video and where to retrieve the video. As described above, the metadata descriptor file may refer to files or portions of files that do not exist yet, and the advertisement insertion tool 108 can receive requests from the media player for different portions of the video at one or more different quality profiles. For example, the media player may start out requesting media content that has been encoded at a 200 kb/s rate and determines that it can get better, and start requesting portions of the media content at a higher rate. As far as the mobile phone and media player is concerned, the media content has been encoded according to the different quality profiles for the adaptive streaming, and does not know that the advertisement insertion tool 108 has created new slices to accommodate the advertisement insertion.

In one embodiment, when doing the pre-processing of the media content, the advertisement insertion tool 108 can read the encoded media content 142, using the container reader 222 without actually decoding the encoded video frames 333 and the encoded audio samples 335. In effect, the container reader 222 can read a container (sometimes called a wrapper) to obtain metadata information, and can read the pass the video and audio samples to the decoder, but instruct the decoder not to decode, for example, to determine which video frames are key frames without using the computational resources to decode the actual video frames. Alternatively, the encoded video frames 333 and audio samples 335 can be discarded before being sent to the decoders. In one embodiment, there is a container and the container has the audio samples and the video frames that are encoded. The container can be opened and read without using computational resources to decode the audio samples and video frames, especially, since this pre-processing does not require decoded the video frames to obtain the actual pixel data or the audio samples. These frames and samples can be discarded before the decoders or the decoders can be instructed not to decode in order to quickly process the encoded media content 142. In one embodiment, the pre-processing may be done by a pipeline processing architecture as illustrated in FIG. 3A in which the advertisement insertion tool 108 orchestrates the pre-processing. In one exemplary embodiment, the advertisement insertion tool 108 fetches a file (or portion of a file) that has the encoded media content 142. The container reader 222 reads the container, such as the AVI container or MP4 container (or other types of containers, such as MP3, MKV or the like). The container reader 222 outputs the encoded video frames 333 and the encoded audio samples 335, as well as any other metadata information in the container. For example, an MP4 container may indicate that there are 2 media tracks in this file, one being video the other audio, that the video is H264 encoded, and the audio is AAC in stereo. When the container reader 222 outputs the frames and samples, the advertisement insertion tool 108 can determine the track of the frame or sample, whether it is audio or video. The video frames being output may also include a flag that indicates that it is a key frame. The advertisement insertion tool 108 can identify the type and duration of the samples and frames. For example, the advertisement insertion tool 108 can determine that a video frame has a presentation time of 20.2 seconds from the beginning and it is a key frame and that the corresponding audio has 1024 audio samples. Although the actual data has not been accessed yet, the output of the container reader 222 splits into two different pipelines, one pipeline for the audio codec (audio decoder 228), and the other for the video codec (video decoder 226). The decoders, when instructed to decode, output the raw video frame 337 and the raw audio samples 339 into the video frame buffer 242 and the audio frame buffer 244, respectively. Thus, the advertisement insertion tool 108 can instruct the decoders to not encode the video frames 333 and the audio samples 335 when performing the pre-processing. However, when servicing an advertisement insertion request 301, the advertisement insertion tool 108 can instruct the decoders to decode the video frames 333 and the audio samples 335 when needed to re-encode frames and samples for the new slices.

In another embodiment, the advertisement insertion tool 108 may be configured to not send the video frames and audio samples to the decoders when performing the pre-processing. In another embodiment, the advertisement insertion tool 108 may be configured to instruct the decoders to discard the video frames and audio samples. Alternatively, the advertisement insertion tool 108 can use a series of commands to turn the decoders on and off. When the decoders are off the video frames and audio frames may be passed through without being decoded and then subsequently discarded.

In one embodiment, the advertisement insertion tool 108 may record a presentation for all key frames and the location of the key frame within the actual file. This is done to build the index of these points that can be jumped to in order to start reading the data when decoding and encoding the data into the slice 345.

In another embodiment, when the preprocessing is done in connection with the request, the advertisement insertion tool 108 can read the encoded media content 142 to determine the index points for the key frames. When the advertisement insertion tool 108 needs to convert or re-encode any particular frame, the advertisement insertion tool 108 can decode the key frame any subsequent delta frames for the designated time range, and discharge the other frames. This way, the advertisement insertion tool 108 does not use a lot of computational resources decoding all frames, but only those that are needed to create the new slices. These decoded frames can be stored in the video frame buffer 242. In another embodiment, the advertisement insertion tool 108 can discard everything until it has identified the specific key frame needed to decode the first frame of the requested time range, and then go back and start decoding from the key frame up through the requested time range. The video and audio stored in the buffers 242 and 244 can then be used to create a slice for the requested time range. In particular, the advertisement insertion tool 108 can instruct the audio encoder 234 and video encoder 232 to encode the raw data into encoded audio frames and video frames for the slice 345. The advertisement insertion tool 108 can instruct the slice creator 224 to create the slice with the necessary encoded audio frames and video frames.

In another embodiment, when the first frame of the new slice, such as the second new slice after the advertisement, is not a key frame, the advertisement insertion tool 108 can decode the frame as described above (decoding from the previous key frame and any intervening delta frames), and then re-encode this first frame as a key frame. The subsequent frames to this first frame may be able to be copied from the original data so that the advertisement insertion tool 108 does not have to re-encode the subsequent delta frames after the newly created key frame. This may speed up the operation, and may not lose any quality by re-encoding the video frames. Alternatively, the advertisement insertion tool 108 can re-encode all video frames again as would be appreciated by one of ordinary skill in the art having the benefit of this disclosure. In some embodiments, the advertisement insertion tool 108 may create an index so that frames that are not independently decodable (delta frames) can be decoded and encoded as a key frame that is independently decodable. The subsequent delta frames may be encoded again or may be copied from the original data.

Figure 3B:
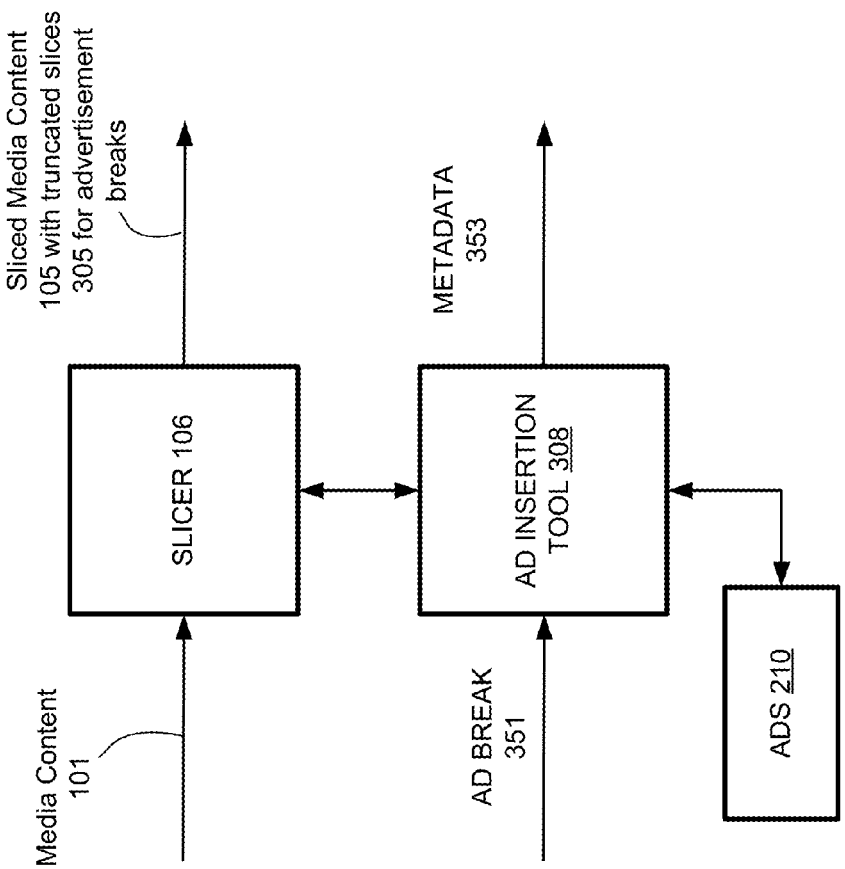
FIG. 3B is a diagram that illustrates a flow of operation of an advertisement insertion tool to truncate slices to accommodate advertisement insertions into the media content according to one embodiment.

FIG. 3B is a diagram that illustrates a flow of operation of an advertisement insertion tool 308 to truncate slices to accommodate advertisement insertions into the media content according to one embodiment. The advertisement insertion tool 308 works in connection with the slicer 106. The advertisement insertion tool 106 may reside on the same computing system 104 as the slicer 306 at the event facility. Alternatively, the advertisement tool 106 may reside on a different computing system than the computing system that executes the slicer 106. As described above, the slicer 106 receives the media content 101 and generates slices of the media content, outputting the sliced media content 105. The sliced media content 105 can be subsequently encoded as described herein. The details of slicing by the slicer 106 are not repeated here. In this embodiment, the advertisement tool 308 can work in connection with the slicer 106 to slice the media content and to truncate one or more slices to accommodate an advertisement break.

In one embodiment, the advertisement insertion tool 308 receives an indication of an advertisement break 351. This indication may be a start time indicating where in the media content one or more advertisements need to be inserted into the stream. In one embodiment, the indication also indicates a duration of the advertisement break 351. Alternatively, the advertisement insertion tool 308 may receive a second indication of the end of the advertisement break. Alternatively, the indication of the advertisement break 351 may indicate a start time and an end time of the advertisement break 351. The advertisement insertion tool 308 identifies a first slice that encompasses the start time of the advertisement break 351. For example, while slicing the media content 106, the advertisement insertion tool 308 receives a signal that an advertisement is to be inserted at a specified presentation time of the media content 101. The advertisement insertion tool 308 can locate the current slice (first slice) being created by the slicer 106 and can truncate the current slice to contain video frames (audio samples, or both video frames or audio samples) up to the start time of the advertisement break 351.

The advertisement insertion tool 308 can insert one or more advertisements into the media content in various ways. In one embodiment, the advertisement insertion tool 308 determines which advertisements are to be inserted and inputs them into the slicer 306. If the advertisements are not already sliced, the slicer 106 can slice the advertisements and output the sliced advertisements with the sliced media content 105. The advertisement insertion tool 308 can use the ADS 210, for example. In another embodiment, the advertisement insertion tool 308 can track information about the advertisement breaks 351, like when the advertisement break 351 is to be inserted, which slices have been truncated, or the like. The advertisement insertion tool 308 can output the tracked information as metadata 353 to the CMS 118 for advertisement insertion at the data center 130. In another embodiment, the CMS 118 can generate or modify the descriptor file to indicate the advertisement breaks in the encoded media content 142 and the individual media players 113 can decide which advertisements are to be inserted at the designated advertisement breaks.

In another embodiment, the advertisement insertion tool 308 receives a second indication comprising an end time of the advertisement break. The advertisement insertion tool 308 identifies a second slice that is the next slice after the end time of the advertisement break 351. The advertisement insertion tool 308 can discard one or more subsequent slices between the first slice and the second slice.

In another embodiment, while the slicer 106 is slicing the media content 101 and the advertisement insertion tool 308 receives a first indication with a start time for the advertisement break 351, the advertisement insertion tool 308 can halt the slicing at the start time until a second indication is received. This second indication designates an end time of the advertisement break 351. In a further embodiment, the advertisement insertion tool 308 receives the second indication that designates the end time of the advertisement break, and instructs the slicer 106 to resume slicing of the media content 101 after the end time of the advertisement break 351. When resuming slicing of the media content 101, the slicer 106 creates a second slice that is the next slice after the end time of the advertisement break 351.

In another embodiment, the advertisement insertion tool 308 inserts an advertisement into the stream at the start time of the advertisement break 351 and creates a descriptor file comprising the first truncated slice, the advertisement and the second slice for streaming by the media player 113. In another embodiment, the advertisement insertion tool 308 creates a descriptor file comprising the first truncated slice, the second slice and an indication of where an advertisement is to be inserted. The descriptor file may be generated by the advertisement insertion tool 308, the CMS 118 or elsewhere. The descriptor file can be created based on a database comprising metadata of the sliced media content as described herein. The media player 113 can read the descriptor file and determine when to insert advertisements for streaming the media content. In another embodiment, the truncated slices themselves can identify where in the stream advertisements are to be inserted. That is, the descriptor file does not have any additional indicator to designate an advertisement break other than a truncated slice in the stream. Alternatively, other techniques may be used to designate where in the stream the advertisement breaks can be inserted, and the truncated slices are used to accommodate advertisement insertion at those presentation times in the media content.

In another embodiment, the advertisement insertion tool 308 inserts an advertisement into the stream at the start time of the advertisement break. The advertisement insertion tool 308 can update a descriptor file to insert the advertisement after the first truncated first slice for streaming by the media player. In one embodiment, the advertisement insertion tool 308 updates an existing descriptor file to replace the first slice with the truncated first slice. That is an entry in the descriptor file can be updated to reflect that the first slice is truncated. As described above, a new descriptor file may be created with the truncated file.

In a further embodiment, the descriptor file comprises a second slice that is the next slice after the first slice. When updating the descriptor file, the advertisement insertion tool 308 inserts the advertisement between the first truncated first slice and the second slice for streaming by the media player.

In another embodiment, the first indication that designates a start time of the advertisement break 351 also indicates a duration of the advertisement break 351. The advertisement insertion tool 308 can determine an end time of the advertisement break 351 from the start time and the duration. In another embodiment, the first indication designates a start time and an end time of the advertisement break 351.

Various embodiments described above describe slicing video frames and truncating the slice to include the frames up to the start time. In other embodiments, the slice includes video frames and audio samples. When truncating the slice, the advertisement insertion tool 308 truncates the first slice to contain the video frames up to the start time of the advertisement break 351 and the audio samples up to the start time of the advertisement break 351.

In another embodiment, the first indication may be a start of black frames and the second indication may be an end of the black frames. The advertisement insertion tool 308 may use an automated process to determine the start of the black frames and the end of the black frames as described herein. In another embodiment, the first indication is a start of an original advertisement in the media content 101 and the second indication is an end of the original advertisement. In one embodiment, the advertisement insertion tool 308 discards one or more subsequent slices of the original advertisement between the first slice and the second slice. The first slice may still be truncated to accommodate the insertion of the advertisement break 351 as described above.

In one embodiment, a computing system includes a memory and a processing device coupled to the memory. The processing device is configured to execute the advertisement insertion tool 308. The advertisement insertion tool 308 performs any of the methodologies described herein.

Figure 4A:
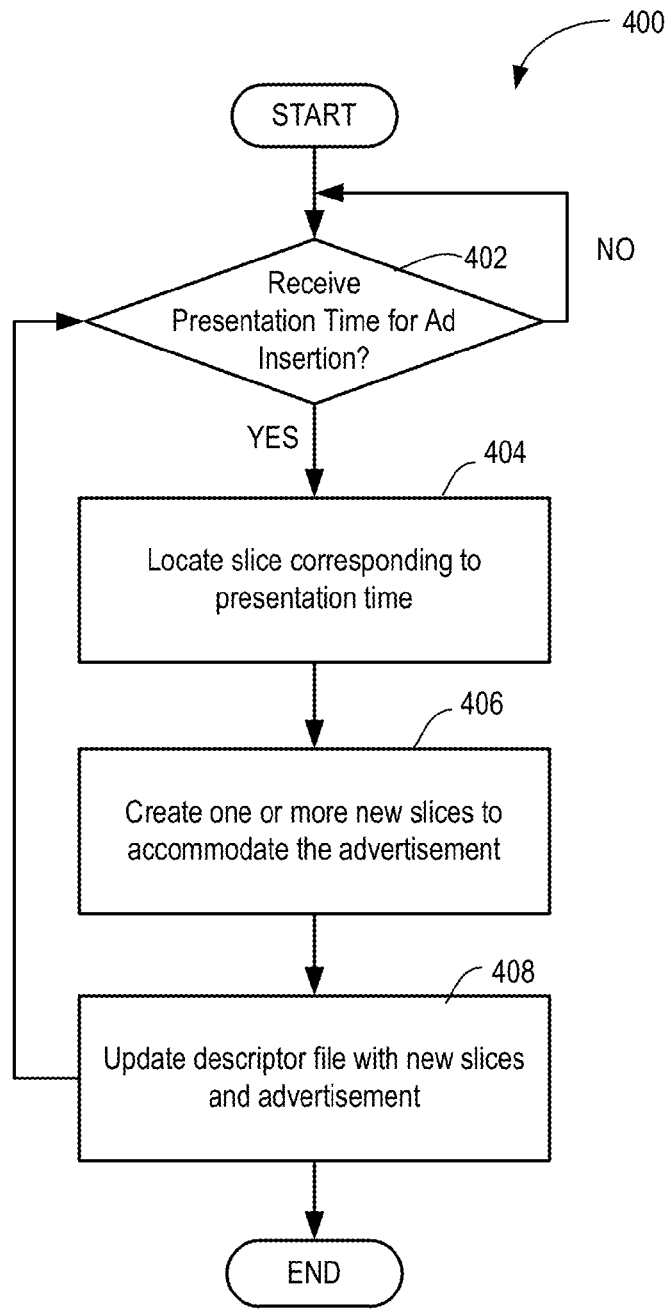
FIG. 4A is a flow diagram of one embodiment of a method of creating new slices to accommodate advertisement insertion.

FIG. 4A is a flow diagram of one embodiment of a method 400 of creating new slices to accommodate advertisement insertion. The method 400 is performed by processing logic that may comprise hardware (circuitry, dedicated logic, etc.), software (such as is run on a general purpose computing system or a dedicated machine), firmware (embedded software), or any combination thereof. In one embodiment, the advertisement insertion tool 108 of FIGS. 1-3B performs the method 400. Alternatively, other components of the one or more server computing systems 116 can perform some or all of the operations of method 400.

Referring to FIG. 4A, processing logic begins with determining if a presentation time is received for advertisement insertion (block 402). The presentation time may be received as part of the advertisement insertion input 109 (or 209) received at the CMS 118. For example, a publisher may playback the media content and may select a point in the media content to insert the advertisement using a graphical user interface tool or other means. Sometimes the original media content 101 has black-out frames in the video stream where the advertisements should be inserted. Other times the original media content 101 has original advertisements in the video stream, but these advertisements need to be replaced with other advertisements. For example, an over-the-air TV feed may already have advertisements, but these advertisements were sold for over-the-air TV only. The advertisement insertion tool 108 can receive a signal indicating when the advertisement break starts and another signal indicating when the advertisement break ends in order to insert different advertisements in place of the original advertisements. The publisher can easily see the blacked-out frames (or the original advertisements) and select the point where the black-out frames begin and end. These selected points can be represented as presentation times that are used by the advertisements insertion tool to create new slices to accommodate the insertion of the advertisement at the appropriate time. In essence, the blacked-out frames can be removed and replaced with the advertisement. In one embodiment, the black frames can be detected by an automated process to designate the playback times for advertisement insertion. In another embodiment, the processing logic waits to receive the advertisement insertion input 109 or 209 at block 402 to determine when to locate the appropriate slice for insertion and to create the new slices to accommodate the advertisement.

If at block 402 the presentation time is not received, the processing logic can return until the presentation time is received. If at block 402 the presentation time is received, the processing logic locates a slice corresponding to the presentation time (block 404). Once located, the processing logic creates one or more new slices to accommodate the advertisement (block 406), and updates the descriptor file with the new slices and the advertisement (block 408). Of course, the processing logic can locate a slice of a single quality profile at block 404, as well as multiple slices that correspond to multiple quality profiles. That is, the processing logic can locate the corresponding slice in each of the quality profiles at block 404 and create the new slices for each of the quality profiles. In this way, the advertisement can be inserted at the same presentation time regardless of the quality profile. The processing logic can also update the descriptor file accordingly.

Figure 4B:
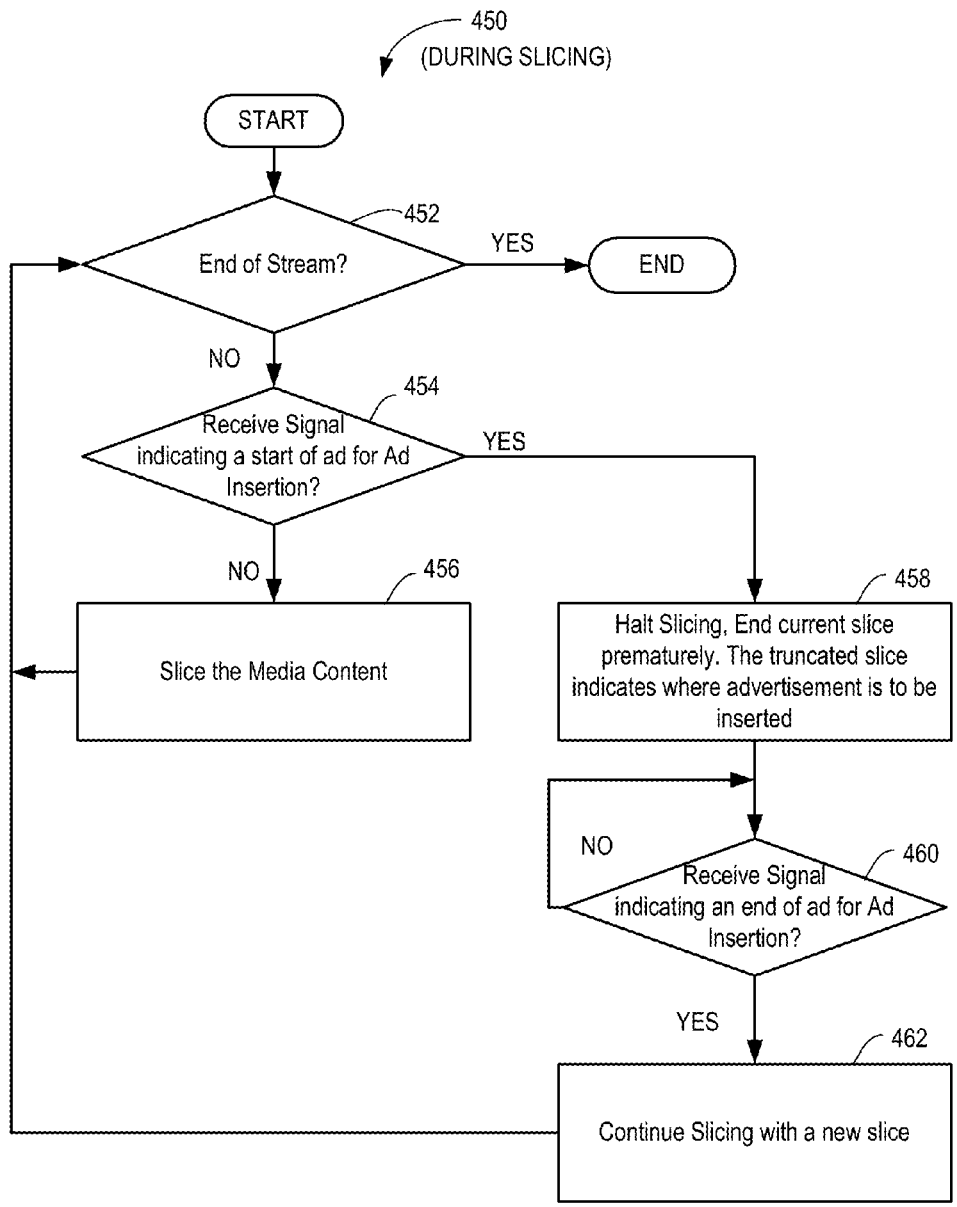
FIG. 4B is a flow diagram of one embodiment of a method of preparing a stream for inserting one or more slices of an advertisement when slicing.

FIG. 4B is a flow diagram of one embodiment of a method 450 of preparing a stream for inserting one or more slices of an advertisement when slicing. The method 450 is performed by processing logic that may comprise hardware (circuitry, dedicated logic, etc.), software (such as is run on a general purpose computing system or a dedicated machine), firmware (embedded software), or any combination thereof. In one embodiment, the advertisement insertion tool 108 of FIGS. 1-3B performs the method 450. Alternatively, other components of the one or more server computing systems 116 can perform some or all of the operations of method 450.

Referring to FIG. 4B, processing logic begins with determining if an end of stream is reached (block 452). If not, the processing logic determines if a signal is received indicating a start of an advertisement for advertisement insertion (block 454). If not, the processing logic slices the media content as normal (block 456) and returns to determine if the end of the stream is reached at block 452. At block 454 when the start signal is received, the processing logic halts the slicing and ends the current slice prematurely regardless of the time remaining in creating the current slice (block 458). This truncated slice indicates where the advertisement is to be inserted. The truncated slice can itself identify where the advertisement is to be inserted or a record of the slice can be stored in a database, as described in more detail below. The processing logic waits until it receives a second signal indicating an end of the advertisement for the advertisement insertion (block 460). In this embodiment, a second signal is received. In another embodiment, the start and end times of the advertisement break can be specified and the slicing is halted for the advertisement break. When the second signal is received at block 460, the processing logic continues the slice with a new slice (block 462). This new slice is the slice to be played back after the advertisement to be inserted is played back. The processing logic continues back to block 452 to determine if the end of the stream is reached. When the end of the stream is reached, the processing logic ends the method 450.

As described herein, the presentation time or start time of the advertisement break can be received as part of the advertisement insertion input 109 (or 209) received at the CMS 118. For example, a publisher may playback the media content and may select a point in the media content to insert the advertisement using a graphical user interface tool or other means. Sometimes the original media content 101 has black-out frames in the video stream where the advertisements should be inserted. Other times the original media content 101 has original advertisements in the video stream, but these advertisements need to be replaced with other advertisements.

In another embodiment, the processing logic, when slicing live media content, for example, can receive end slices prematurely, given a signal from the content owner or publisher. The signal could be in the live stream or could be received out-of-band via e.g. an API call. Basically, at the time of an advertisement break on a live stream, the processing logic receives that signal and that would end the current slice, however long it may be. When the processing logic gets a corresponding signal (or other indication) that the advertisement break is finished, the processing logic starts a new slice as usual and proceeds from there. The net result would be a list of slices with the following durations 4, 4, 4, 2.1, 4, 4, and so on. The list of slices can be used in a first descriptor file as described herein. In this example, the one slice with a 2.1 second duration was truncated because the processing logic received a signal that an advertisement break was started. In reality, there could have been 30 or 60 or more seconds between this slice and the subsequent slice because of the advertisement break, but the actual duration does not matter. As described below with respect to FIG. 4C, at the time of playback, the processing logic can find some existing advertisements from the user's content library and insert them into the list of slices. To continue with the example, the processing logic could end up with a list of files with the following durations 4, 4, 4, 2.1, [4, 4, 4, 4, 4, 1.1,] 4, 4, and so on, where the durations in brackets are from the files for the advertisement(s) inserted. It should be noted that the final slice for the advertisement(s) is shorter simply because the advertisement's total duration was 21.1 seconds in this example. The list of slices can be used in a second descriptor file as described herein. In these embodiments, the runtime advertisement insertion, at the time of playback, may be a less CPU-intensive process because the processing logic doesn't have to open up the slices and create new slices to insert the advertisements.

For another example, an over-the-air TV feed may already have advertisements, but these advertisements were sold for over-the-air TV only. The advertisement insertion tool 108 can receive a signal indicating when the advertisement break starts and another signal indicating when the advertisement break ends in order to insert different advertisements in place of the original advertisements. The publisher can easily see the blacked-out frames (or frames of the original advertisement(s)) and select the point where the black-out frames begin and end. These selected points can be represented as presentation times that are used by the advertisements insertion tool to end the current slice and start a new slice and to determine where to insert one or more slices for the advertisements to accommodate the insertion of the advertisement at the appropriate time. In essence, the blacked-out frames (or frames of the original advertisement(s)) can be removed and replaced with the advertisement. In one embodiment, the black frames can be detected by an automated process to designate the playback times for advertisement insertion. In another embodiment, the processing logic waits to receive the advertisement insertion input 109 or 209 at block 454 to determine when to prematurely end (truncate) the appropriate slice for advertisement insertion and to start a new slice after the advertisement to accommodate the advertisement insertion.

Of course, the processing logic can perform the method on slices of a single quality stream or on slices of multiple quality profiles. That is, the processing logic can slice the media content to accommodate the advertisement insertion and can insert the slices of the advertisement in the designated locations in each of the different quality profiles. In this way, the advertisement can be inserted at the same presentation time regardless of the quality profile. The processing logic can also update the descriptor file accordingly. The advertisement can also be sliced into multiple quality profiles to correspond to the different quality profiles of the stream. Alternatively, the advertisements can be encoded according to a single quality profile or more or less quality profiles than the stream itself.

In another embodiment, for VOD at the time of slicing, the user (content owner or publisher) can specify where advertisement breaks should be. This can come as information in a metadata file or it can trigger off e.g., chapter breaks present in an MP4 file, or other trigger indicators. Either way, as the processing logic slices the media content and reaches a presentation time for an advertisement break, the processing logic can truncate the current slice and then immediately start a new slice in the media content. As with live streams, this effectively allows the processing logic to skip the pre-processing or the creation of slices to accommodate advertisements insertions. Put another way, if a user wanted to insert an advertisement at the exact point in time between two slices, the processing logic can list the slices for the content, then list the slices for the advertisement, then list the rest of the slices for the content all in the descriptor file 144 (e.g., M3U8 file). There would be no need to look for key frames or anything inside the slice(s). If the advertisement is not to be inserted at a slice boundary, by truncating the slice where the ad break could go, the processing logic creates an advertisement insertion spot in the slicing of the media content for inserting one or more advertisements, and simply listing the advertisement slices (e.g., URLs for the slices of the advertisement(s)) in the descriptor file 144 (e.g., M3U8 file).

Figure 4C:
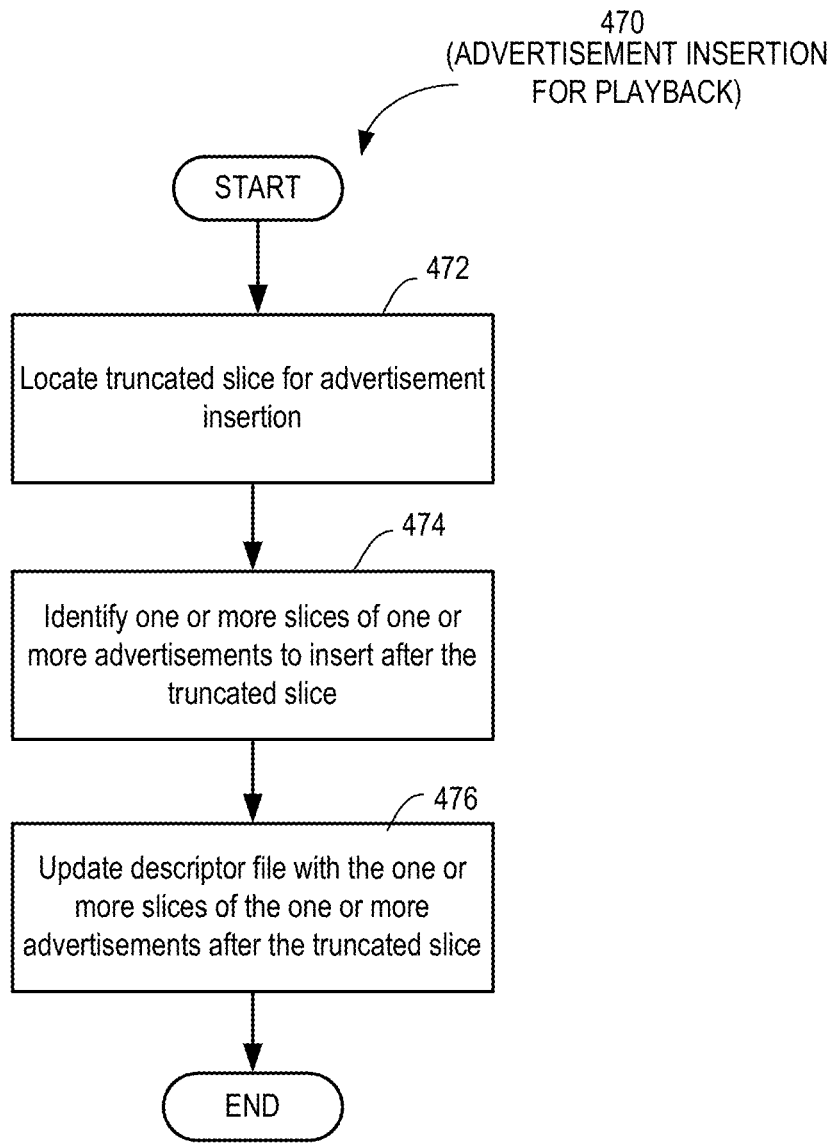
FIG. 4C is a flow diagram of one embodiment of a method of inserting the one or more slices of an advertisement into a stream for streaming.

FIG. 4C is a flow diagram of one embodiment of a method 470 of inserting the one or more slices of an advertisement into a stream for streaming. The method 470 is performed by processing logic that may comprise hardware (circuitry, dedicated logic, etc.), software (such as is run on a general purpose computing system or a dedicated machine), firmware (embedded software), or any combination thereof. In one embodiment, the advertisement insertion tool 108 of FIGS. 1-3B performs the method 470. Alternatively, other components of the one or more server computing systems 116 can perform some or all of the operations of method 470.

Referring to FIG. 4C, processing logic begins with locating a truncated slice for advertisement insertion (block 472). As described above, the truncated slice can itself identify where the advertisement is to be inserted since its file may have a duration that is less than the durations of the other files. Alternatively, a record of the slice where the advertisement is to be inserted can be tracked and stored in a database. For example, the processing logic can store in the database a list of locations where the advertisement breaks occur in the stream. For example, the database may keep track of the fact that the stream has 100 normal duration slices, like 4 seconds, followed by a 1.5 second slice that indicates where the advertisement(s) is to be inserted, and then followed by a second number of normal duration slices.

In another embodiment, the processing logic truncates a slice in the media content (e.g., live stream or VOD asset) at a time of slicing the media content based on an indication that an advertisement break is to be inserted at a specified point in the media content. The processing logic, prior to playback, inserts an advertisement by inserting one or more advertisement slices into a descriptor file at the specified point indicated by the truncated slice.

In another embodiment, the processing logic receives advertisement insertion input identifying a presentation time in media content to insert an advertisement. In response to the input, the processing logic inspects an original slice of the media content that contains the media content at the presentation time to locate a key frame at or prior to the presentation time. The processing logic creates a first new slice comprising the media content of the original slice up to the presentation time and creates a second new slice comprising the media content of the original slice after the presentation time. The processing logic updates a descriptor file to include the first new slice, the advertisement, and the second new slice for streaming by a media player executing on a client computing system.

In a further embodiment, the processing logic inspects the original slice by reading a container comprising encoded video frames and pre-processing the encoded video frames to locate the key frame and a last frame corresponding to the media content at the presentation time. The processing logic creates the first new slice to include the key frame, any intervening delta frames and the last frame. In one embodiment, the processing logic copies only the key frame, any intervening delta frames, and the last frame of the original slice without decoding the media content of the container. In another embodiment, the processing logic copies the media content of the original slice and discards subsequent frames after the last frame corresponding to the presentation time. The copying and discarding may be performed without decoding the media content of the container.

In another embodiment, the processing logic creates the second new slice by decoding the key frame, any intervening delta frames and a first frame of the media content after the presentation time from the original slice into raw video. The processing logic re-encodes the raw vide of the first frame as a second key frame. In other words, the first frame may be converted from a delta frame to a key frame from the raw video data. The processing logic creates the second new slice with the second key frame and subsequent frames after the first frame until an end of the original slice.

In another embodiment, the processing logic creates the new slice with the second key frame and the subsequent frames by copying the subsequent frames from the original slice without decoding the subsequent frames of the original slice. In another embodiment, the processing logic decodes the subsequent frames of the original slice into raw video and re-encodes the raw video of the subsequent frames of the original slice for the subsequent frames of the second new slice.

In another embodiment, the processing logic inspects the original slice by reading a container comprising encoded video and decoding the key frame, any intervening delta frames and a last frame corresponding to the media content at the presentation time. The processing logic creates the first new slice by re-encoding the key frame, any intervening delta frames and the last frame. In a further embodiment, the processing logic creates the second new slice by decoding a first frame of the media content after the presentation time from the original slice into raw video, re-encoding the raw video of the first frame as a second key frame. The processing logic creates the new slice with the second key frame and subsequent frames after the first frame until an end of the original slice.

In another embodiment, the processing logic creates the second new slice by copying the subsequent frames from the original slice without decoding the subsequent frames of the original slice. In another embodiment, the processing logic creates the second new slice by decoding the subsequent frames of the original slice into raw video and re-encoding the raw video of the subsequent frames of the original slice for the subsequent frames of the second new slice.

In another embodiment, the processing logic inspects the original slice by reading a container comprising encoded video frames and encoded audio samples. The processing logic splits the encoded video frames into a first processing pipeline and the encoded audio samples into a second processing pipeline. The processing logic, using the first processing pipeline, inspects the original slice of the media content to locate the key frame.

In another embodiment, the processing logic inspects the original slice by accessing an index of the media content that identifies key frames of the media content. The index may have been previously generated when pre-processing the media content, such as when added to a content library by a publisher. Alternatively, the index may be generated in response to receiving a first advertisement insertion request or on-the-fly as needed.

In another embodiment, the processing logic receives a first indication of a start time of where an advertisement is to be inserted into media content. The processing logic also receives a second indication including at least one of an end time of the advertisement or a duration of the advertisement. The first and second indications may be part of the same advertisement insertion request, such as described herein. In a further embodiment, the processing logic receives the duration of the advertisement, such as in the advertisement insertion request, and determines the end time of the advertisement from the start time and the duration. Alternatively, the first indication can be a start of black frames in the media content and the second indication is an end of the black frames in the media content. The start of black frames and the end of black frames may be determined by an automated process. Alternatively, a publisher may manually review the media content to identify the start of the black frames and the end of the black frames as described herein. In another embodiment, the advertisement insertion request includes a start time and a duration of an advertisement to be inserted or a start time and an end time for the advertisement. It should be noted that the first and second indications can be for a generic advertisement or for a specific advertisement. For example, the advertisement insertion can be a placeholder and an ADS, for example, could be used to fill the advertisement insertion based on various factors, such as a user profile, geographical locations of the requesting computer, or the like.

In this embodiment, the processing logic inspects a first original slice of the media content that contains the media content at the start time to locate a first key frame at or prior to the start time. The processing logic creates a first new slice including the media content of the first original slice up to the start time. The processing logic also inspects a second original slice of the media content that contains the media content at the end time to locate a second key frame at or prior to the end time. The processing logic creates a second new slice including the media content of the second original slice after the end time until an end of the second original slice.

In a further embodiment, the processing logic updates a descriptor file to include the first new slice, the advertisement, and the second new slice for streaming by a media player executing on a client computing system. The processing logic may update the descriptor file to exclude any intervening slices between the first original slice and the second original slice when applicable, such as illustrated in FIG. 5B.

In another embodiment, the processing logic inspects the first original slice and the second original slice by reading a container comprising encoded video frames and pre-processing the encoded video frames to locate the first key frame and a last frame corresponding to the media content at the start time and to locate the second key frame and a first frame corresponding to the media content after the end time. The processing logic creates the first new slice by including the first key frame, any intervening delta frames and the last frame. The processing logic creates the second new slice by converting the first frame into a third key frame and creating the second new slice to include the third key frame and subsequent frames after the third key frame to an end of the second original slice. In a further embodiment, the processing logic copies the subsequent frames from the second original slice without decoding the subsequent frames of the second original slice.

Figure 5A:
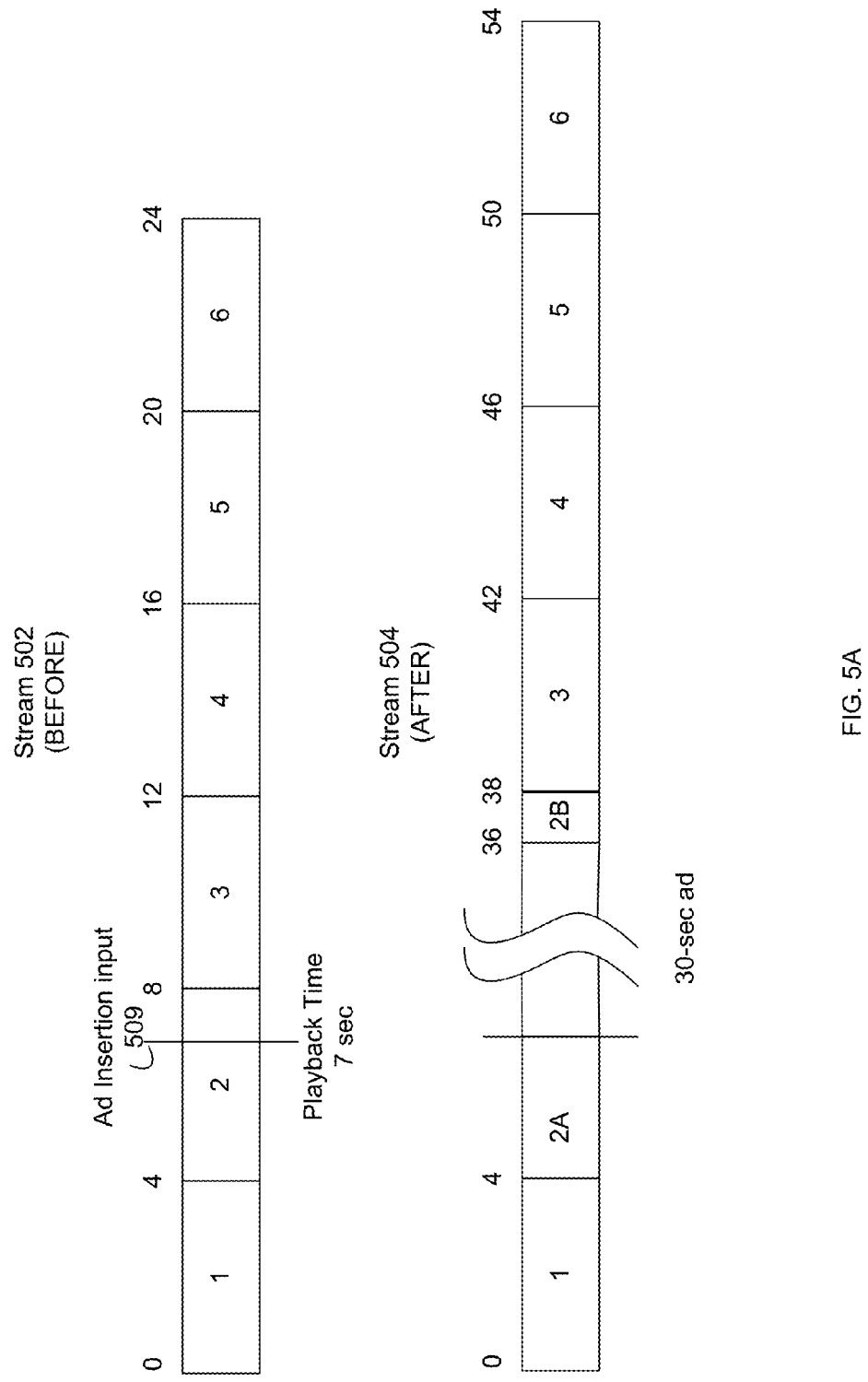
FIG. 5A illustrates a stream of slices of media content before and after advertisement insertion according to one embodiment.
Figure 5B:
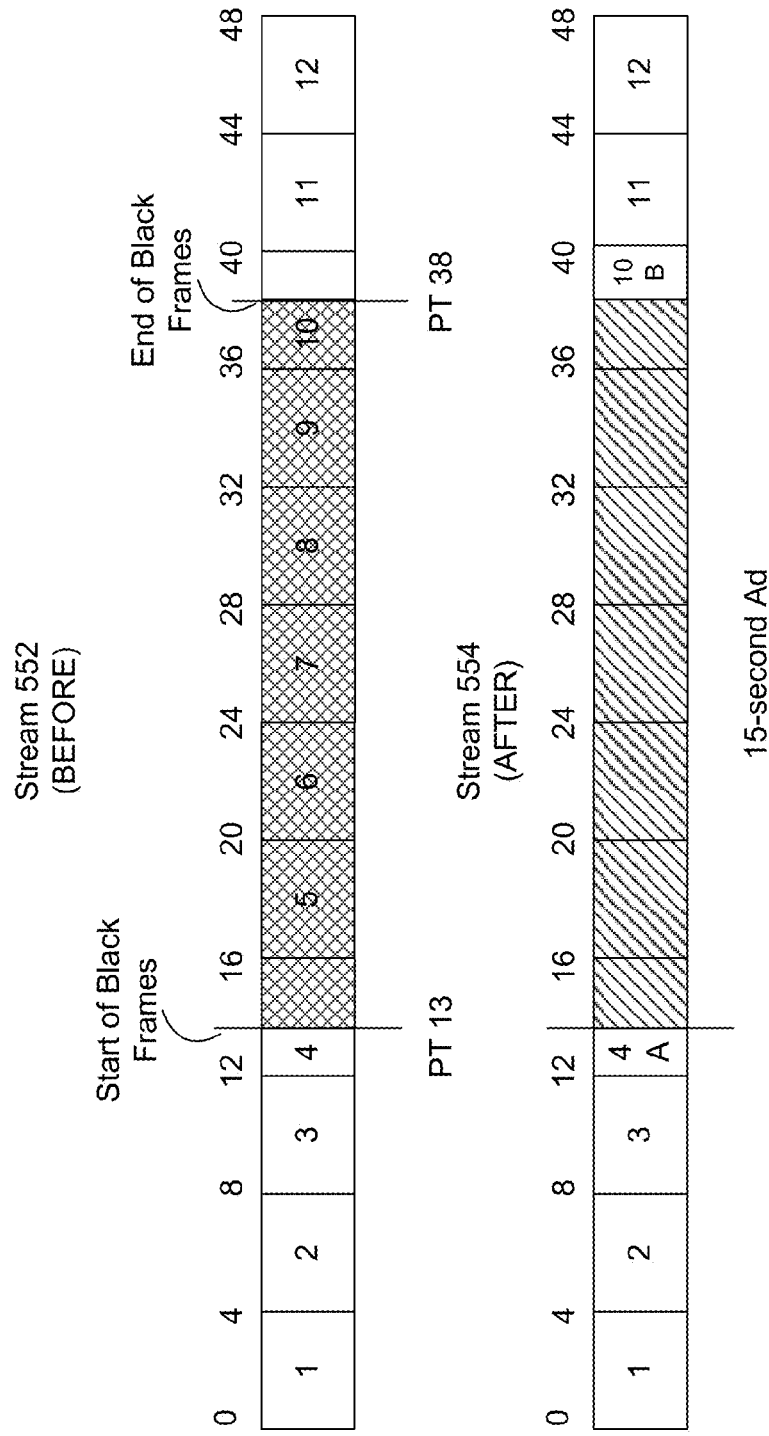
FIG. 5B illustrates a stream of slices of media content before and after advertisement insertion according to another embodiment.

FIG. 5A illustrates a stream of slices of media content before and after advertisement insertion according to one embodiment. The stream 502 is the stream before advertisement insertion. In this embodiment, the advertisement insertion tool 108 receives an advertisement insertion input 509 that designates where in the stream 502 an advertisement should be inserted. It should be noted that a slice contains multiple frames, including key frames and delta frames. In this embodiment, each slice has at least a key frame at the slice boundary, such as at playback times 0, 4, 8, 12, 16 and so on. The slice may have additional key frames, but the advertisement insertion input 509 may not necessarily correspond to a key frame. As a result, the advertisement insertion tool 108 creates two new slices to accommodate the advertisement insertion. To do this, the advertisement insertion tool 108 locates the slice that corresponds to a playback time of the advertisement insertion input 509. In the depicted embodiment, this is slice #2. The advertisement insertion tool 108 may create the first new slice #2A by modifying the slice #2, such as by dropping the data that corresponds to the frames after the playback time of the media content after the advertisement insertion input 509 (e.g., playback time of 7 seconds in the depicted embodiment). In another embodiment, the advertisement insertion tool 108 may create the first new slice #2A by copying the corresponding data from the slice #2 that corresponds to the playback time up to the playback time of the advertisement insertion input 509 (e.g., playback time of 7 seconds). The advertisement insertion tool 108 may create the second new slice #2B by locating the previous key frame before the frame corresponding to the first frame of the new slice #2B after the advertisement insertion input 509, and decoding the key frame and the subsequent frames up to the first frame of the new slice #2B to obtain the raw frame data for the first frame of the new slice #2B located at presentation time 36 seconds. The advertisement insertion tool 108 can convert this frame into a new key frame for the new slice #2B. In one embodiment, the advertisement insertion tool 108 then copies the remaining frames in the slice from the original slice #2. In another embodiment, the advertisement insertion tool 108 could decode and re-encode the remaining frames to the end of the slice#2, but copying the existing data from slice #2 may be quicker.

The resulting stream 504 of slices after the advertisement insertion can be played back with an advertisement (e.g., 30-second advertisement in the depicted embodiment). Since the advertisement insertion tool 108 created the new slice #2B, the media player can request and playback the new slice #2B after playing the advertisement in a smooth manner. It should be noted that the new slice #2B is independently requestable and independently playable by the media player. It should also be noted that the streams 502 and 504 represent a single quality profile of the media content. This process can be repeated for multiple quality profiles. However, once the presentation times and frames have been identified in the first stream, this information can be used to locate the appropriate frames in the other quality profiles.

In order to stream the stream 504 with the advertisement, the advertisement insertion tool 108 updates the descriptor file so that the media player requests the new slices #2A and #2B and the advertisement accordingly. The following tables illustrate entries of a descriptor file before and after the advertisement insertion.

| PLAYLIST (BEFORE ADVERTISEMENT INSERTION) |
| --- |
| Slice #1 |
| Slice #2 |
| Slice #3 |
| Slice #4 |
| Slice #5 |
| Slice #6 |

| PLAYLIST (AFTER ADVERTISEMENT INSERTION) |
|---|
| Slice #1 |
| Slice #2A |
| 30-sec Advertisement |
| Slice #2B |
| Slice #3 |
| Slice #4 |
| Slice #5 |
| Slice #6 |

Of course, other slice durations and advertisements can be used as would be appreciated by one of ordinary skill in the art having the benefit of this disclosure. Also, more than one advertisement may be inserted into the stream 502.

The following illustrates an example of a first descriptor file (e.g., M3U8 file) before advertisement insertion and an example of a second descriptor file after the advertisement insertion.

First Descriptor File Before Advertisement Insertion
EXTM3U
EXT-X-VERSION:4
EXT-X-TARGETDURATION: 5
EXT-X-MEDIA-SEQUENCE:0
EXTINF:4.0107,
/content/C00000000.ts
EXTINF:4.0107,
/content/C00000001.ts
EXTINF:4.0107,
/content/C00000002.ts
EXTINF:4.0107,
/content/C00000003.ts
EXTINF:4.0107,
/content/C00000004.ts
EXTINF:4.0107,
/content/C00000005.ts
EXTINF:4.0107,
/content/C00000006.ts
EXTINF:4.0107,
/content/C00000007.ts
EXTINF:4.0107,
/content/C00000008.ts
EXTINF:4.0107,
/content/C00000009.ts
EXTINF:4.0107,
/content/C0000000A.ts
EXT-X-ENDLIST
Second Descriptor File after Advertisement Insertion
EXTM3U
EXT-X-VERSION:4
EXT-X-TARGETDURATION: 5
EXT-X-MEDIA-SEQUENCE:0
EXTINF:4.0107,
/content/C00000000.ts
EXTINF:4.0107,
/content/C00000001.ts
EXTINF:4.0107,
/content/C00000002.ts
EXTINF:4.0107,
/content/C00000003.ts
EXTINF:4.0107,
/content/C00000004.ts
EXT-X-DISCONTINUITY
EXTINF:4.0403,
/ad/C00000000.ts
EXTINF:4.0403,
/ad/C00000001.ts
EXTINF:4.0403,
/ad/C00000002.ts
EXTINF:4.0403,
/ad/C00000003.ts
EXTINF:4.0403,
/ad/C00000004.ts
EXTINF:4.0403,
/ad/C00000005.ts
EXTINF:4.0403,
/ad/C00000006.ts
EXTINF:2.2291,
/ad/C00000007.ts
EXT-X-DISCONTINUITY
EXTINF:4.0107,
/content/C00000005.ts
EXTINF:4.0107,
/content/C00000006.ts
EXTINF:4.0107,
/content/C00000007.ts
EXTINF:4.0107,
/content/C00000008.ts
EXTINF:4.0107,
/content/C00000009.ts
EXTINF:4.0107,
/content/C0000000A.tx
EXT-X-ENDLIST The value after the EXTINF tag is the slice's duration. As noted, the last slice for the advertisement has a duration (e.g., 2 seconds) that is less than a full-slice duration (e.g., 4 seconds). The first descriptor file shows an uninterrupted sequence of slice files. As shown in the second descriptor file, the second descriptor file includes the same list of slice files, but the list has been split in two with an advertisement inserted between them. It should be noted that the second descriptor file may be the same descriptor file as the first descriptor file and the contents of the first descriptor file is modified by the advertisement insertion tool 108 to insert the advertisement. Alternatively, the advertisement insertion tool 108 can create a new descriptor file with the advertisement inserted to be used in place of the first descriptor file as would be appreciated by one of ordinary skill in the art having the benefit of this disclosure. As another alternative embodiment, the descriptor file could be generated on demand as needed by storing the information for the descriptor file in a database; instead of modifying a descriptor file to insert advertisements as described above, the system would generate a different descriptor file based on whether or not advertisements should be present.

FIG. 5B illustrates a stream of slices of media content before and after advertisement insertion according to another embodiment. The stream 552 is the stream before advertisement insertion. In this embodiment, the advertisement insertion tool 108 receives an advertisement insertion input that designate where in the stream 542 an advertisement should be inserted. In this embodiment, the stream 552 includes black frames that have been inserted to designate where the advertisements should be inserted. It should be noted that the black frames may represent the actual time available for advertisements to be inserted or may be longer or shorter than the duration of advertisements to be inserted. A publisher or editor may review the media content and mark the playback times of the start of the black frames and the end of the black frames, and the start time and duration of the black frames or the start and end times of the black frames can be input into the advertisement insertion tool 108. In another embodiment, the black frames can be detected by an automated process to designate the playback times for advertisement insertion. For convenience, the depicted embodiment shows that the black frames are 15 seconds in duration and a 15-second advertisement is to be inserted in place of the black frames.

In this embodiment, each slice has at least a key frame at the slice boundary, such as at playback times 0, 4, 8, 12, 16 and so on. The slice may have additional key frames, but the black frames may not necessarily correspond to the slice boundaries. As a result, the advertisement insertion tool 108 creates two new slices to accommodate the advertisement insertion, slices #4A and #10B. However, unlike the stream 502 in FIG. 5A in which slice #2 is effectively split into two new streams #2A and #2B, the stream 552 discards the frames that include black frames and creates the new frame #4A for the frames of slice #4 before the advertisement insertion and the new frame #10B for the frames of slice #10 after the advertisement insertion. To do this, the advertisement insertion tool 108 locates the slice that corresponds to a playback time of the start of the black frames, as well as the playback time of the end of the black frames. In the depicted embodiment, these are slice #4 and slice #10. The advertisement insertion tool 108 may create the first new slice #4A by modifying the slice #4, such as by dropping the data that corresponds to the frames after the playback time of the media content after the start of the black frames (e.g., playback time of 13 seconds in the depicted embodiment). In another embodiment, the advertisement insertion tool 108 may create the first new slice #4A by copying the corresponding data from the slice #4 that corresponds to the playback time up to the start of the black frames (e.g., playback time of 13 seconds). The advertisement insertion tool 108 may create the second new slice #10B by locating the previous key frame before the frame corresponding to the first frame of the new slice #10B after the end of the black frames, and decoding the key frame and the subsequent frames up to the first frame of the new slice #10B to obtain the raw frame data for the first frame of the new slice #10B. The advertisement insertion tool 108 can convert this frame into a new key frame for the new slice #10B. In one embodiment, the advertisement insertion tool 108 then copies the remaining frames in the slice from the original slice #10. In another embodiment, the advertisement insertion tool 108 could decode and re-encode the remaining frames to the end of the slice #10, but copying the existing data from slice #10 may be quicker.

The resulting stream 554 of slices after the advertisement insertion can be played back with an advertisement (e.g., 15-second advertisement in the depicted embodiment). Since the advertisement insertion tool 108 created the new slice #10B, the media player can request and playback the new slice #10B after playing the advertisement in a smooth manner. It should be noted that the new slice #10B is independently requestable and independently playable by the media player. It should also be noted that the streams 552 and 554 represent a single quality profile of the media content. This process can be repeated for multiple quality profiles. However, once the presentation times and frames have been identified in the first stream, this information can be used to locate the appropriate frames in the other quality profiles.

In order to stream the stream 554 with the advertisement, the advertisement insertion tool 108 updates the descriptor file so that the media player requests the new slices #4A and #10B and the 15-second advertisement accordingly. The following tables illustrate entries of a descriptor file before and after the advertisement insertion.

| PLAYLIST (BEFORE ADVERTISEMENT INSERTION) |
| --- |
| Slice #1 |
| Slice #2 |
| Slice #3 |
| Slice #4 |
| Slice #5 |
| Slice #6 |
| Slice #7 |
| Slice #8 |
| Slice #9 |
| Slice #10 |
| Slice #11 |
| Slice #12 |

| PLAYLIST (AFTER ADVERTISEMENT INSERTION) |
| --- |
| Slice #1 |
| Slice #2 |
| Slice #3 |
| Slice #4A |
| 30-sec Advertisement |
| Slice #10B |
| Slice #11 |
| Slice #12 |

Of course, other slice durations and advertisements can be used as would be appreciated by one of ordinary skill in the art having the benefit of this disclosure. Also, more than one advertisement may be inserted into the stream 552.

Figure 6:
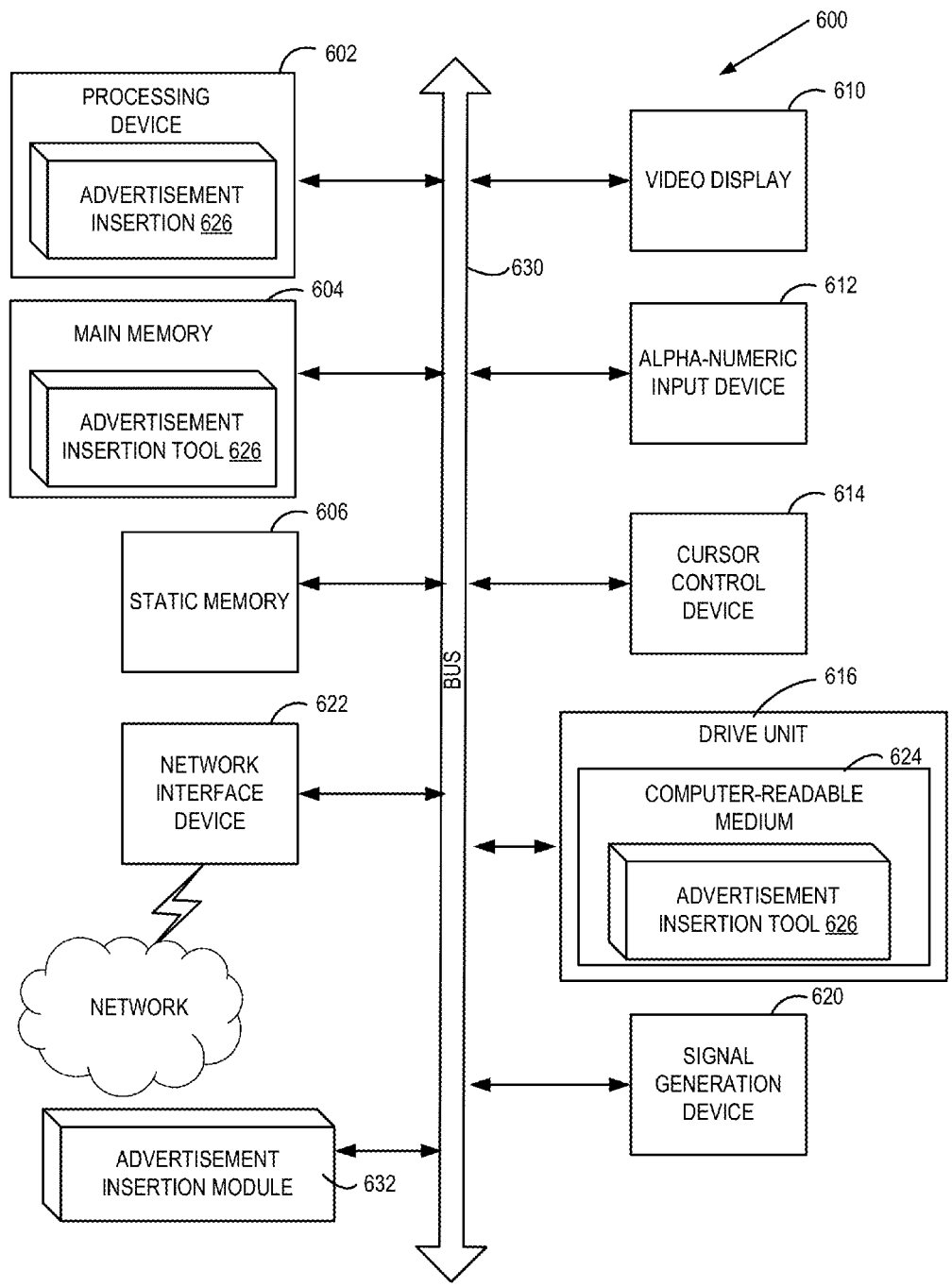
FIG. 6 illustrates a diagrammatic representation of a machine in the exemplary form of a computing system for advertisement insertion.

FIG. 6 illustrates a diagrammatic representation of a machine in the exemplary form of a computing system 600 for advertisement insertion. Within the computing system 600 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for advertisement insertion, such as the method 400 described above. In one embodiment, the computing system 600 represents various components that may be implemented in the one or more server computing systems 116 as described above. Alternatively, the server computing system 116 may include more or less components as illustrated in the computing system 600.

The exemplary computing system 600 includes a processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a data storage device 616, each of which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic (e.g., advertisement insertion 626) for performing the operations and steps discussed herein.

The computing system 600 may further include a network interface device 622. The computing system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable storage medium 624 on which is stored one or more sets of instructions (e.g., advertisement insertion 626) embodying any one or more of the methodologies or functions described herein. The advertisement insertion 626 may also reside, completely or at least partially, within the main memory 604 and/or within the processing device 602 during execution thereof by the computing system 600, the main memory 604 and the processing device 602 also constituting computer-readable storage media. The advertisement insertion 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The advertisement module 632, components, and other features described herein (for example in relation to FIGS. 4A, 4B and 4C) can be implemented as discrete hardware components or integrated in the functionality of hardware components such as ASICS, FPGAs, DSPs, or similar devices. The advertisement module 632 may implement operations of advertisement insertion as described herein with respect to FIG. 4A, 4B or FIG. 4C. In addition, the advertisement module 632 can be implemented as firmware or functional circuitry within hardware devices. Further, the advertisement module 632 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
    identifying media content comprising a stream of slices;
    receiving, by an advertisement insertion tool executing by a processing device, a first indication of a start time of an advertisement break to be inserted into the stream of slices of the media content;
    identifying, from the stream of slices a first slice that encompasses the start time of the advertisement break;
    inspecting a container of the first slice to locate key frames, wherein the container comprises metadata information and encoded video frames, wherein the inspecting the container is performed without decoding the encoded video frames;
    creating a modified slice that contains the encoded video frames up to the start time of the advertisement break and does not contain the encoded video frames after the start time of the advertisement break; and
    creating a new slice that contains encoded video frames after an end time of the advertisement break, wherein creating the new slice comprises:
        locating a preceding key frame prior in time to the end time;
        decoding the preceding key frame and any intervening video frames between the preceding key frame and a frame at the end time; and
        creating, from the decoded frame at the end time, a new key frame for the new slice.

2. The method of claim 1, further comprising:
    receiving, by the advertisement insertion tool, a second indication comprising the end time of the advertisement break;
    identifying a second slice of the stream of slices that contains the end time of the advertisement break, wherein the second slice is the new slice; and
    discarding any one or more subsequent slices between the first slice and the second slice.

3. The method of claim 1, further comprising:
    slicing the media content into the stream of slices, wherein the receiving the first indication comprises receiving the first indication while slicing the media content; and
    halting the slice of the media content at the start time until a second indication is received, wherein the second indication comprises the end time of the advertisement break.

4. The method of claim 3, further comprising:
    receiving, by the advertisement insertion tool, the second indication comprising the end time of the advertisement break; and
    resuming the slicing of the media content after the end time of the advertisement break, wherein the resuming comprises creating the new slice.

5. The method of claim 4, further comprising:
    inserting an advertisement into the stream at the start time of the advertisement break; and creating a descriptor file comprising the modified slice, the advertisement and the new slice for streaming by a media player executing on a client computing system.

6. The method of claim 1, further comprising inserting an advertisement into the stream at the start time of the advertisement break.

7. The method of claim 6, further comprising:
updating a descriptor file to insert the advertisement after the modified slice for streaming by a media player executing on a client computing system; and
updating the descriptor file to replace the first slice with the modified slice.

8. The method of claim 1, wherein the receiving the first indication further comprising receiving a duration of the advertisement break, and wherein the method further comprises determining the end time of the advertisement break from the start time and the duration.

9. The method of claim 1, wherein the first slice comprises audio samples corresponding to the video frames, and wherein creating the modified slice comprises creating the first slice to contain the encoded video frames up to the start time of the advertisement break and the audio samples up to the start time of the advertisement break.

10. The method of claim 1, wherein the first indication is a start of black frames in the media content.

11. The method of claim 10, wherein the start of the black frames is determined by an automated process.

12. The method of claim 1, wherein the first indication is a start of an original advertisement in the media content.

13. The method of claim 1, wherein creating the new slice comprises creating the new slice to contain the encoded video frames of the first slice after the start time of the advertisement break.

14. The method of claim 1, wherein the start time of the advertisement break is not on a slice boundary.

15. A non-transitory computer readable storage medium including instructions that, when executed by a processing device, cause the processing device to perform operations comprising:
identifying media content comprising a stream of slices;
receiving, by an advertisement insertion tool executing by a processing device, a first indication of a start time of an advertisement break to be inserted into the stream of slices of the media content;
identifying, from the stream of slices a first slice that encompasses the start time of the advertisement break:
inspecting a container of the first slice to locate key frames, wherein the container comprises metadata information and encoded video frames, wherein the inspecting the container is performed without decoding the encoded video frames;
creating a modified slice that contains the encoded video frames up to the start time of the advertisement break and does not contain the encoded video frames after the start time of the advertisement break; and
creating a new slice that contains encoded video frames after an end time of the advertisement break, wherein creating the new slice comprises:
locating a preceding key frame prior in time to the end time;
decoding the preceding key frame and any intervening video frames between the preceding key frame and a frame at the end time; and
creating, from the decoded frame at the end time, a new key frame for the new slice.

16. The non-transitory computer readable storage medium of claim 15, wherein the operations further comprise:
receiving, by the advertisement insertion tool, a second indication comprising the end time of the advertisement break;
identifying a second slice of the stream of slices that contains the end time of the advertisement break, wherein the second slice is a different slice than the first slice; and
discarding any one or more subsequent slices between the first slice and the second slice.

17. The non-transitory computer readable storage medium of claim 15, wherein the operations further comprise:
slicing the media content into the stream of slices, wherein the receiving the first indication comprises receiving the first indication while slicing the media content; and
halting the slice of the media content at the start time until a second indication is received, wherein the second indication comprises the end time of the advertisement break.

18. A computing system comprising:
a memory; and
a processing device, coupled to the memory, wherein the processing device is configured to execute an advertisement insertion tool, wherein the advertisement insertion tool is to:
identify media content comprising a stream of slices;
receive a first indication of a start time of an advertisement break to be inserted into the stream of slices of the media content;
identify, from the stream of slices a first slice that encompasses the start time of the advertisement break;
identifying, from the stream of slices a first slice that encompasses the start time of the advertisement break;
create a modified slice that contains the encoded video frames up to the start time of the advertisement break and does not contain the encoded video frames after the start time of the advertisement break: and
create a new slice that contains encoded video frames after an end time of the advertisement break, wherein the advertisement insertion creates the new slice by locating a preceding key frame prior in time to the end time, decoding the preceding key frame and any intervening video frames between the preceding key frame and a frame at the end time, and creating, from the decoded frame at the end time, a new key frame for the new slice.

19. The computing system of claim 18, wherein advertisement tool is further configured to:
receive a second indication comprising end time of the advertisement break;
identify a second slice of the stream of slices that contains the end time of the advertisement break, wherein the second slice is a different slice than the first slice; and
discard any one or more subsequent slices between the first slice and the second slice.

20. The computing system of claim 18, wherein advertisement tool is further configured to:
slice the media content into the slices until receiving the first indication; and
halt the slice of the media content at the start time until a second indication is received, wherein the second indication comprises the end time of the advertisement break.

* * * * *